US012791091B2

(12) United States Patent
Ekonen et al.

(10) Patent No.: US 12,791,091 B2
(45) Date of Patent: Nov. 10, 2026

(54) DIFFERENTIAL DISCONNECT AND LOCKER ASSEMBLY

(71) Applicant: LINAMAR CORPORATION, Guelph (CA)

(72) Inventors: Todd Ekonen, Brighton, MI (US); Mitchell Holland, Royal Oak, MI (US); Evan Swinger, Farmington Hills, MI (US)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 18/873,198

(22) PCT Filed: Jul. 7, 2023

(86) PCT No.: PCT/US2023/027124

§ 371 (c)(1),
(2) Date: Dec. 9, 2024

(87) PCT Pub. No.: WO2024/010927

PCT Pub. Date: Jan. 11, 2024

(65) Prior Publication Data

US 2025/0361931 A1 Nov. 27, 2025

Related U.S. Application Data

(60) Provisional application No. 63/446,060, filed on Feb. 16, 2023, provisional application No. 63/358,890, filed on Jul. 7, 2022.

(51) Int. Cl.
*F16H 48/40* (2012.01)
*B60K 17/346* (2006.01)
(Continued)

(52) U.S. Cl.
CPC ......... *F16H 48/40* (2013.01); *B60K 17/3462* (2013.01); *F16H 48/42* (2013.01); *B60K 23/08* (2013.01)

(58) Field of Classification Search
CPC . B60K 23/08; B60K 2023/0841; F16H 48/40; F16H 2048/385; F16H 48/24; F16H 2048/085
(Continued)

(56) References Cited

U.S. PATENT DOCUMENTS

| | | | | |
|---|---|---|---|---|
| 1,682,386 A * | 8/1928 | Lewis | F16H 48/30 | 475/237 |
| 4,541,503 A * | 9/1985 | Akutagawa | B60K 17/346 | 180/247 |

(Continued)

FOREIGN PATENT DOCUMENTS

| | | | |
|---|---|---|---|
| DE | 1008063904 A1 | 7/2010 | |
| DE | 1016213233 A1 | 1/2018 | |
| DE | 102017218089 A1 * | 4/2019 | F16H 48/24 |

*Primary Examiner* — Sherry L Estremsky
(74) *Attorney, Agent, or Firm* — Miller Canfield

(57) ABSTRACT

A differential disconnect and locker assembly for a vehicle includes a stationary housing, a rotatable ring gear, a differential housing and cover, a pinion gear assembly comprising pinion gears drivingly connectable to the ring gear and side gears meshing with the pinion gears. The assembly includes a differential disconnect assembly operatively connected between the ring gear and the pinion gear assembly which is actuatable to operatively disconnect the ring gear from the pinion gear assembly. The assembly also includes a differential locker slidably coupled to the differential housing or cover and operatively connected to the side gear. The differential locker is actuatable to operatively disconnect the differential housing or the cover from the side gear allowing the side gear to rotate relative to the differential housing or the differential cover.

17 Claims, 14 Drawing Sheets

(51) Int. Cl.
*F16H 48/42* (2012.01)
*B60K 23/08* (2006.01)

(58) Field of Classification Search
USPC .......................................................... 180/247
See application file for complete search history.

(56) References Cited

U.S. PATENT DOCUMENTS

| | | | | |
|---|---|---|---|---|
| 4,788,888 | A * | 12/1988 | Tsutsumikoshi ........ | F16H 48/30<br>180/250 |
| 4,875,978 | A * | 10/1989 | Hiketa .............. | B60K 17/3462<br>180/247 |
| 5,385,513 | A * | 1/1995 | Ishii ........................ | F16H 48/08<br>475/198 |
| 5,890,989 | A * | 4/1999 | Yamazaki ............. | B60K 23/08<br>192/69.82 |
| 8,801,561 | B1 * | 8/2014 | Kii ......................... | B60K 23/08<br>475/198 |
| 11,098,794 | B2 * | 8/2021 | Yudell ..................... | F16H 48/32 |
| 12,228,203 | B2 * | 2/2025 | Verbridge ........... | F16H 57/0456 |
| 2021/0172506 | A1 * | 6/2021 | Swinger .................. | F16H 48/38 |
| 2022/0194223 | A1 * | 6/2022 | Zingerle ................. | F16H 48/40 |
| 2025/0128595 | A1 * | 4/2025 | Führer .................... | F16H 48/08 |

* cited by examiner

DIFFERENTIAL DISCONNECT AND LOCKER ASSEMBLY

CROSS-REFERENCE TO RELATED APPLICATIONS

This application claims priority to U.S. Provisional Application 63/358,890, filed on Jul. 7, 2022 and to U.S. Provisional Application 63/446,060, filed on Feb. 16, 2023, the disclosures of which are hereby incorporated by reference in its entirety.

FIELD AND BACKGROUND OF THE INVENTION

The present invention relates to a differential disconnect assembly for use in a driveline of a motor vehicle. More particularly, the invention relates to a differential disconnect assembly having a locking differential for an automotive vehicle.

DESCRIPTION OF RELATED ART

Automotive all-wheel drive (AWD) vehicles may be primarily driven by a front axle powered by the vehicle engine through a gear box. Power may also be transferred to a rear axle by a power take off, drive axle and rear drive unit. The rear drive unit converts the rotational power from the drive axle to left and right side shafts to drive each of the left and right rear wheels of the vehicle. The side shafts are driven by side gears in a differential supported by a differential housing and cover and are driven by rotation of a ring gear. The side gears are in meshed engagement with pinion gears, which are driven by the ring gear and thereby drive torque to the side shafts. It is commonly known for vehicles to include a disconnect assembly engaged between the ring gear and pinion gears to connect and disconnect the ring gear from the differential pinion gears of the differential.

It is commonly known for vehicles to include locking differentials to prevent relative rotation of one driven wheel with respect to another driven wheel. This is usually accomplished by locking one differential side gear to a differential case or housing thereby preventing rotation of the side gear with respect to the case or housing. It is also known to provide a hydraulically or electrically actuated clutch for locking and unlocking the side gear of the differential assembly relative to the differential housing. However, such designs may be undesirable since it is necessary for the differential case or housing to be sufficiently robust to handle the torsional loading being transferred between a ring gear and side gears.

It is desirable to remove the torsional loading on the differential housing, allowing the housing to be smaller while still handling the axial and radial loading requirements on the side gear or even allowing the differential housing to be eliminated. It is also desirable to provide a single actuator configured to selectively engage the disconnect assembly and to engage the locking differentials.

SUMMARY OF THE INVENTION

According to one embodiment, there is provided a differential disconnect and locker assembly for a vehicle. The differential disconnect and locker assembly includes a stationary housing, a rotatable ring gear rotatably supported by the stationary housing, a pinion gear assembly comprising a plurality of pinion gears drivingly connectable to the ring gear, and a plurality of side gears rotatably disposed within the stationary housing and meshing with the pinion gears such that the side gears and the pinion gears rotate together. The differential disconnect and locker assembly also includes a differential housing and a differential cover rotatably supported on the stationary housing. The ring gear rotates together with at least one of the differential housing and the differential cover. In addition, the disconnection of the ring gear from the pinion gear assembly allows the ring gear, the differential housing, and the differential cover to stop spinning while the side gears are spinning. The differential disconnect and locker assembly also includes a differential disconnect assembly operatively connected between respective surfaces of the ring gear and the pinion gear assembly such that the ring gear, the pinion gears, and the side gears when connected rotate together. The differential disconnect assembly is actuatable to operatively disconnect the ring gear from the pinion gear assembly to disconnect torque transmission between the ring gear and the pinion gears and prevent driving rotation of the ring gear by the pinion gears during wheel rotation. The differential disconnect and locker assembly also includes a differential locker slidably coupled to one or more of the differential housing and the differential cover and operatively connected to one of the side gears such that the one or more of the differential housing and the differential cover and the one of the side gears when connected rotate together. The differential locker is actuatable to operatively disconnect the one or more of the differential housing and the differential cover from the one of the side gears allowing the one of the side gears to rotate relative to the one or more of the differential housing and the differential cover.

According to another embodiment, there is provided a differential disconnect and locker assembly for a vehicle. The differential disconnect and locker assembly includes a stationary housing, a rotatable ring gear rotatably supported by the stationary housing, and a differential housing rotatably supported on the stationary housing. The ring gear rotates together with the differential housing. The differential disconnect and locker assembly also includes a pinion gear assembly comprising a plurality of pinion gears drivingly connectable to the ring gear, a gear nest supported radially and axially by the differential housing and can spin freely relative to the differential housing, and a plurality of side gears rotatably disposed within the stationary housing and meshing with the pinion gears such that the side gears and the pinion gears rotate together. The differential disconnect and locker assembly also includes a differential disconnect assembly including a spline ring which is movable into and out of engagement with one or more of the ring gear and the gear nest such that the ring gear, the pinion gears, and the side gears when connected rotate together. The differential disconnect assembly also includes a shift ring fixedly coupled to the spline ring which is movable into and out of engagement with the one of the side gears to respectively lock or unlock the side gear with the gear nest. The differential disconnect assembly is actuatable to operatively disconnect the ring gear from the gear nest to disconnect torque transmission between the ring gear and the pinion gears and prevent driving rotation of the ring gear by the pinion gears during wheel rotation. Disconnection of the ring gear from the pinion gear assembly allows the ring gear and the differential housing to stop spinning while the side gears are spinning.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

FIGS. 1-15 illustrate components of a differential disconnect and locker assembly 10 for use in an automotive vehicle according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
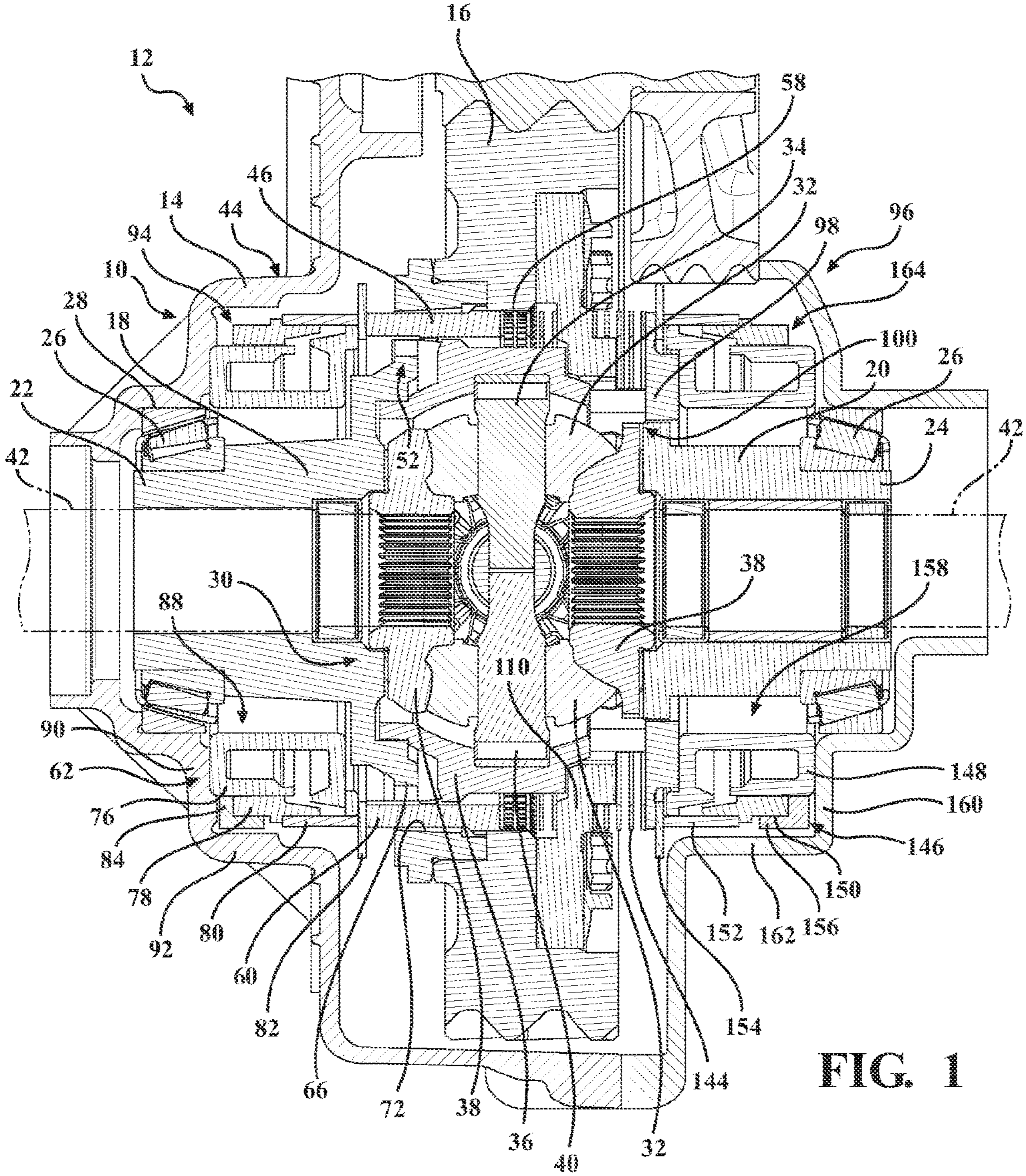
FIG. 1 is a cross-section side view of a differential disconnect and locker assembly, according to a first embodiment of the present invention.

Referring to FIG. 1, the differential disconnect and locker assembly 10 (hereinafter, "disconnect/locker") is provided in a vehicle gear box 12 which is provided on a vehicle. The gear box 12 may also be referenced as the vehicle axle as understood from the following description. The gear box 12 includes a stationary housing 14 defining an interior compartment in which a ring gear 16, a differential housing 18, and a differential cover 20 are housed. In addition, the stationary housing 14 is stationarily supported on the vehicle. The gear box 12 is operatively connected to the drive shaft or the vehicle drive train and engine or motor, wherein the ring gear 16 is rotatably driven by the drivetrain. The ring gear 16 is configured to engage with and be driven by a vehicle drive shaft or drive train, which in turn is driven by a vehicle engine or motor. The ring gear 16 is supported, both axially and radially, by the differential housing 18 and the differential cover 20. As such, the ring gear 16, the differential housing 18, and the differential cover 20 rotate together within the interior compartment in the stationary housing 14. The differential housing 18 and the differential cover 20 include respective end flanges 22 and 24 that are rotatably supported on the stationary housing 14 by a set of bearings 26. The stationary housing 14 defines a pair of bearing seats 28, which support the bearings 26. In the alternative, it will be understood that this inventive design would also allow the ring gear 16 to be directly supported by bearings on the stationary housing 14 which would allow elimination of either or both of the differential housing 18 or differential cover 20.

The gear box 12 shown in FIG. 1 includes a pinion gear assembly 30 rotatably supported within the stationary housing 14. The pinion gear assembly 30 includes opposing differential pinion gears 32, a pinion shaft 34, a differential gear nest 36, and opposing differential side gears 38. The differential pinion gears 32 (hereinafter, "pinion gears") are rotatably connected together by the pinion shaft 34 which is mechanically connected to the differential gear nest 36 (hereinafter, "gear nest"). In addition, the pinion gears 32 are in meshed engagement with the differential side gears 38 (hereinafter, "side gears") such that torque can be transferred from the gear nest 36 to the pinion gears 32 and then to the side gears 38.

The pinion shaft 34 rotatably supports the pinion gears 32 on the ends thereof and rotates with the pinion gears 32 as the pinion gears 32 travel about the side gears 38. The disconnect/locker 10 further includes a connector pin 40 fixedly coupling the pinion shaft 34 to the gear nest 36 so that the pinion gears 32, the pinion shaft 34, and the gear nest 36 all travel together about the same shaft axis as the side gears 38. The gear nest 36 is supported, both radially and axially, by the differential housing 18 and differential cover 20, and thus can spin freely relative to both as the gear nest 36 travels with the pinion gears 32 about the side gears 38. The gear nest 36 could be supported by other components such as the ring gear 16, the stationary housing 14, bearings or the like.

Depicted in FIG. 1, the side gears 38 are supported by the stationary housing 14 and preferably by the differential housing 18 and the differential cover 20, respectively. The side gears 38 operate to drive torque to any combination of shafts 42, which may by any type of output shafts, half shafts, link shafts, etc. as is known in the art. These shafts 42 thereby rotate with and selectively drive vehicle wheels connected thereto. The housing end flange 22 and the cover end flange 24 are open to allow the shafts 40 of the side gears 38 to extend axially therefrom for driving of the wheels. Due to the connection of the shafts 42 and side gears 38 to the wheels, the shafts 42 and side gears 38 will rotate when the wheels rotate. The side gears 38 are in meshed engagement with the pinion gears 32 and the ring gear 16 is engageable with the gear nest 36 such that torque can transfer from the ring gear 16 through the gear nest 36, the pinion gears 32 and then the side gears 38 to thereby drive the shafts 42.

However, as noted above, it is desirable to decouple the ring gear 16 and side gears 38 so that the ring gear 16 need not rotate at all times when the wheels are rotating. As such, the gear box 12 includes the disconnect/locker 10 having a differential disconnect assembly 44 (hereinafter, "differential disconnect") provided between the ring gear 16 and the pinion gear assembly 30, and preferably between the ring gear 16 and gear nest 36, wherein the differential disconnect 44 is selectively operated to connect and disconnect the ring gear 16 from the pinon gears 32. Disconnection of the ring gear 16 and the gear nest 36 allows the ring gear 16, differential housing 18, bearings 26, and the rest of the gear box 12 to stop spinning while the wheels of the vehicle are spinning.

Figure 2:
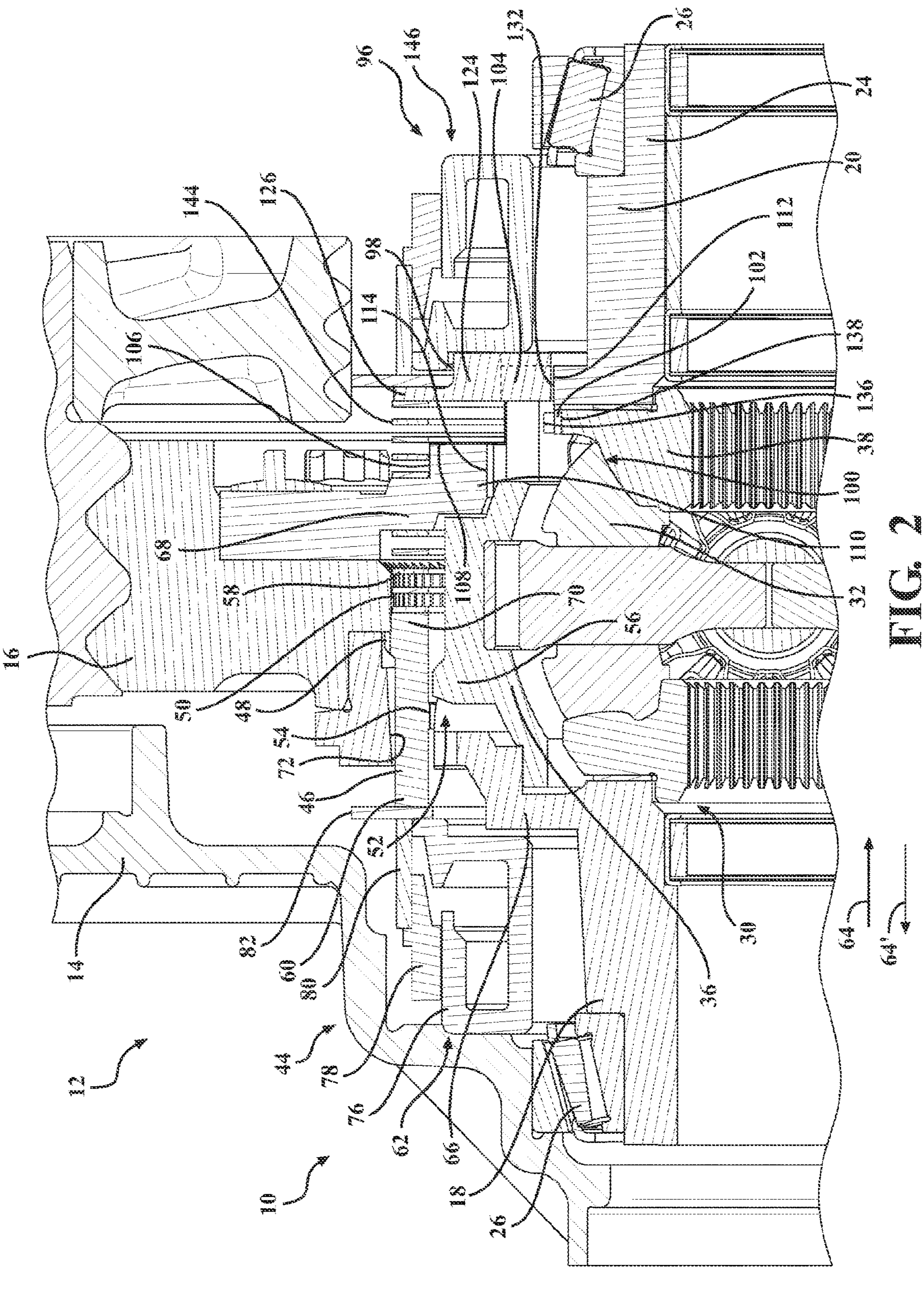
FIG. 2 is an enlarged cross-section side view of a portion of the differential disconnect and locker assembly of FIG. 1 showing a differential disconnect in a disconnected condition and a differential locker in an unlocked condition, according to a first embodiment of the present invention.

The differential disconnect 44 is normally disconnected in this embodiment. To connect the gear nest 36 and ring gear 16, the differential disconnect 44 includes a spline ring 46, which is radially piloted and slidable axially on the inside of the differential housing 18. Referring to FIG. 2, the spline ring 46 has an outer surface, which preferably includes radial connector projections 48 that engage with complementary connector formations 50 on the inside surface of the ring gear 16 to define a mechanical connection which locks the spline ring 46 rotationally to the ring gear 16. The connector projections 48 may be formed as spline teeth or other similar structures which lock relative rotation of the ring gear 16 and spline ring 46 when engaged while permitting axial displacement of the spline ring 46 between a disconnected position in FIG. 2 and a connected position of FIG. 3. In the alternative, it will be understood that the spline ring 46 might be mechanically connected with the gear nest 36 and slidably engage and disengage from the ring gear 16, particularly if the differential housing 18 and/or differential cover 20 are eliminated.

Figure 3:
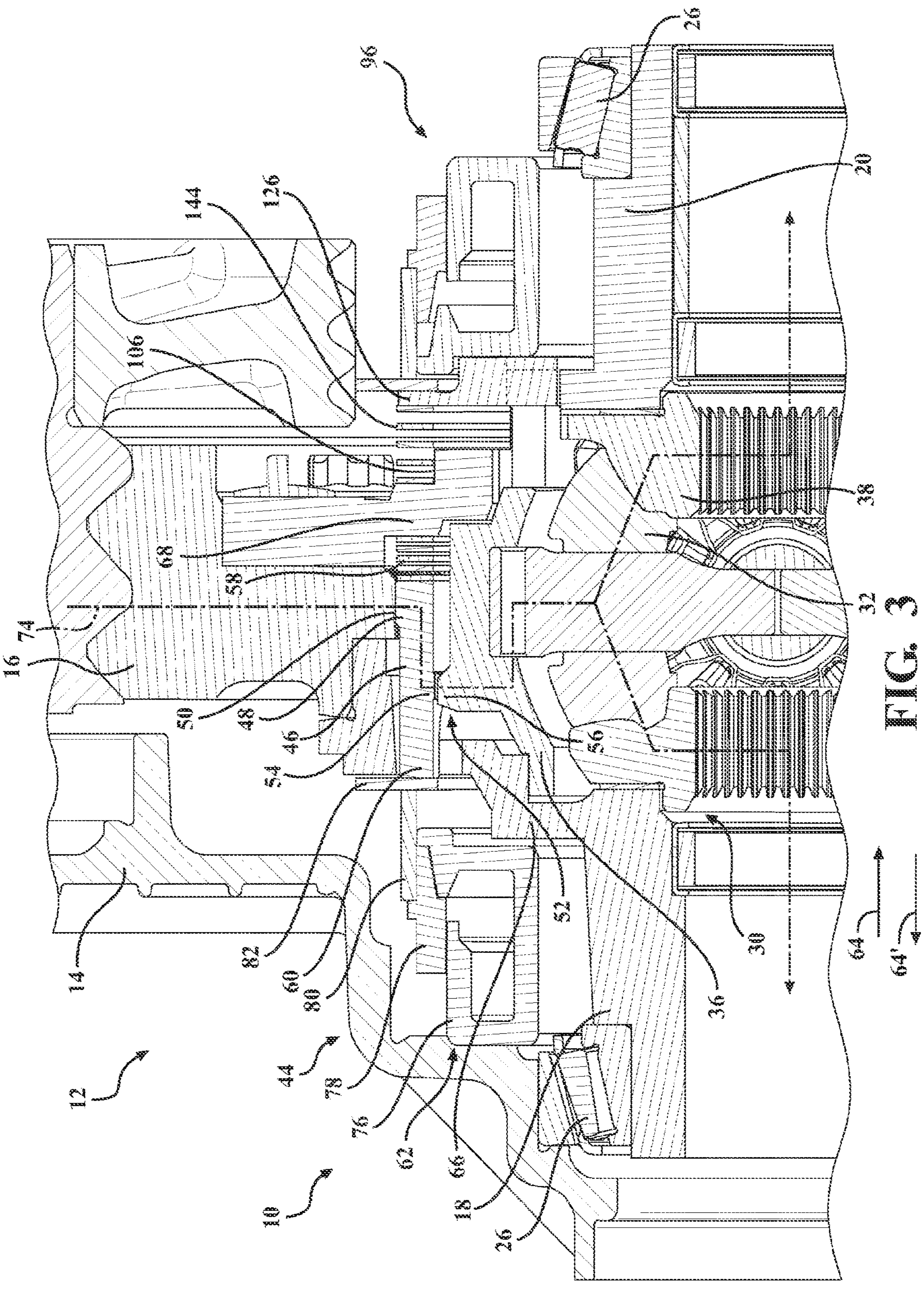
FIG. 3 is a cross-section side view of the differential disconnect and locker assembly of FIG. 2 showing the differential disconnect in a connected condition and the differential locker in the unlocked condition.

Referring to FIGS. 2 and 3, the spline ring 46 releasably connects with and disconnects from the gear nest 36 during axial sliding of the spline ring 46 to releasably connect the ring gear 16 to the gear nest 36 and pinion gears 32. Depicted in FIG. 2, the differential disconnect 44 comprises a releasable disconnect clutch 52 which preferably is defined by a set of clutch teeth or other similar locking formations 54 on the inside diameter or surface of the spline ring 46 and complementary locking formations 56 on the outer diameter or surface of the gear nest 36. In the alternative, it will be understood that the spline ring 46 might be mechanically connected with the gear nest 36 and slidably engage and disengage from the ring gear 16 to connect and disconnect torque transmission, particularly if the differential housing 18 and/or the differential cover 20 are eliminated. Further, the differential disconnect 44 includes a disconnect return spring 58 (hereinafter, "disconnect spring") operatively coupled between a proximal end of the spline ring 46 and the differential cover 20 and configured to bias the spline ring 46 towards the disconnected position relative to the locking formations 56 on the gear nest 36. In addition, the spline ring 46 includes one or more drive arms 60 extending axially away from the proximal end of the spline ring 46. The disconnect spring 58 acts as a biasing member to normally bias the spline ring 46 into or out of engagement with the ring gear 16 and the gear nest 36.

Depicted in FIG. 2, the differential disconnect 44 also includes a disconnect actuator 62 operatively coupled to the drive arms 60 and configured to selectively reposition the spline ring 46 between the disconnected position (FIG. 2) and the connected position (FIG. 3). In operation, when the disconnect actuator 62 is activated, the disconnect actuator 62 will move the spline ring 46 axially inward (arrow 64) causing the spline ring 46 to engage the disconnect clutch 52 between the spline ring 46 and the gear nest 36 as seen in FIG. 3, allowing torque to travel from the ring gear 16, through the spline ring 46, and into the gear nest 36. The disconnect spring 58 will move the spline ring 46 axially outward (arrow 64') when the disconnect actuator 62 is deactivated and will disengage the disconnect clutch 52 between the spline ring 46 and gear nest 36, thereby allowing the gear nest 36 to spin freely relative to the ring gear 16. In this embodiment, the spline ring 46 is normally biased by the disconnect spring 58 to the disconnected or open condition shown in FIG. 2. The disconnect actuator 62 in turn is activated or operated to drive the spline ring 46 axially inward (arrow 64) to the connected or closed condition of FIG. 3.

Shown in FIG. 2, the disconnect spring 58 normally biases the spline ring 46 to the open position of FIG. 2, wherein the locking formations 54 and 56 are separated and disengaged, such that the ring gear 16 is rotatably disconnected from the gear nest 36. However, the spline ring 46 may be driven axially by the disconnect actuator 62 to engage the locking formations 54 and 56 of the disconnect clutch 52 and as seen in FIG. 3 when the disconnect actuator 62 is operated and activated. Referring to FIG. 2, an interior surface of the ring gear 16 and an exterior surface of the gear nest 36 in combination with a side wall 66 of the differential housing 18 and an opposing radial wall 68 of the differential cover 20 essentially define opposed surfaces which are spaced apart to permit axial sliding of an outer shoulder 70 of the spline ring 46 during movement of the spline ring 46. In addition, the drive arms 60 projects axially through complementary windows 72 in the differential housing 18. When the disconnect actuator 62 is activated as shown in FIG. 3, the ring gear 16 is now rotatably connected to the gear nest 36 to transfer torque from the ring gear 16, through the spline ring 46, and into the gear nest 36, as illustrated by arrow 74. When the disconnect actuator 62 is deactivated, the disconnect spring 58 returns the spline ring 46 to the open disconnected position of FIG. 2 wherein the disconnect clutch 52 is disengaged to thereby allow the gear nest 36 to spin freely relative to the ring gear 16.

Referring to FIG. 1, to drive the spline ring 46, the disconnect actuator 62 includes a drive unit 76 which is stationarily supported on the stationary housing 14. The drive unit 76 includes a slide ring or pusher 78 which is axially displaceable between the positions of FIGS. 2 and 3. Preferably, the disconnect actuator 62 is an electromagnetic actuator 62 wherein the pusher 78 is driven axially by the drive unit 76 using an electromagnetic force. It will be understood that other types of actuators are suitable such as a motor, worm gear, a cam, a ball ramp, hydraulic or pneumatic piston or other suitable actuators. Depicted in FIG. 1, the pusher 78 in turn may axially drive an intermediate collar 80, which in turn drives a radial plate 82. The intermediate collar 80 is formed out of a non-magnetic material so that the intermediate collar 80 will not interfere with the function of the pusher 78. A spacer 84 may be provided to control the radial and axial position of the pusher 78. The drive arms 60 project axially through complementary windows 72 in the differential housing 18 so that the drive arms 60 may contact the radial plate 82 and be driven by the pusher 78 through the intermediate collar 80. The drive arms 60 preferably do not contact the windows 72 of the differential housing 18 so as to permit axial movement of the spline ring 46.

The drive unit 76 remains stationary while the pusher 78, intermediate collar 80, and the radial plate 82 can move axially but preferably do not rotate with the spline ring 46 during rotation of the ring gear 16. The stationary housing 14 might include anti-rotation features (not shown) to prevent rotation of the radial plate 82. In addition, the drive unit 76 includes a position sensor (not shown) to read position of the radial plate 82 which acts as a target for the position sensor. The spline ring 46 may rotate and slide along the radial plate 82. It will be understood that other types of drive units 76 may be used to selectively displace the spline ring 46. When the drive unit 76 is deactivated, the disconnect spring 58 biases the spline ring 46, the radial plate 82, the intermediate collar 80, and the pusher 78 outward (arrow 64') back to the position of FIGS. 1 and 2 to open the spline connection 52 (i.e., the disconnect clutch), and when the drive unit 76 is activated, reverse movement (arrow 64) of these components occurs to close the disconnect clutch 52 as shown in FIG. 3.

This system is essentially mono-stable since the spline ring 46 normally stays in the disconnected position of FIGS. 1 and 2 unless and until the disconnect actuator 62 is activated to move the spline ring 46 to the connected position of FIG. 3. When the disconnect actuator 62 is deactivated, the spline ring 46 then returns to the disconnected position (FIGS. 1 and 2) due to the biasing of the disconnect spring 58. Further, the normal position of FIGS. 1 and 2 preferably is the open disconnected position, and the active position of FIG. 3 is the closed connected position. It will be understood that the configuration of the spline ring 46 and disconnect spring 58 can be modified to operate so that a normal position is a closed connected position and an active position is an open disconnected position. It will be appreciated that the system might be configured as bi-stable such that the spline ring 46 stays in its current position until the system repositions the spline ring 46.

Depicted in FIG. 1, to reduce the space requirements of the disconnect actuator 62, the drive unit 76 preferably is positioned in an annular pocket 88 defined axially between the side wall 66 of the differential housing 18 and the adjacent bearing 26 and radially outwardly of the end flange 22 of the differential housing 18. This allows the drive unit 76 to fit radially inwardly of the pusher 78, the intermediate collar 80, and the spacer 84 to reduce the radial size of the gear box 12 in this region. These components in turn are enclosed by a radial wall section 90 and annular wall section 92 of the stationary housing 14 to define an actuator compartment 94.

While the spline ring 46 is disposed radially between the ring gear 16 and gear nest 36, the spline ring 46 may alternatively be disposed axially between a modified ring gear and a modified gear nest to perform the functions described herein. Further, the differential disconnect 44 could incorporate other structures in place of the spline ring 46 such as a dog clutch or clutch plates which selectively connect and disconnect torque transfer between the ring gear 16 and the pinion gears 32. In these alternate designs, torque transmission through a differential housing does not occur. This three piece differential design removes the torsional loading from the differential housing 18, allowing the differential housing 18 to be smaller and/or made of different materials which can still handle the axial and radial loading requirements on the disconnect/locker 10 or allow the differential housing 18 to be eliminated entirely.

As noted above, it is desirable to selectively couple the differential cover 20 to one of the side gears 38. As such, the disconnect/locker 10 also includes a differential locker 96 which is selectively operated to connect and disconnect the differential cover 20 from the side gear 38. Disconnection of the differential cover 20 and the adjacent side gear 38 allows the side gear 38 to rotate independently of the differential cover 20. The differential locker 96 is normally unlocked in this embodiment. When the differential locker 96 is in an unlocked condition, the side gears 38 can rotate freely relative to the differential cover 20 and the disconnect/locker 10 acts as a standard open differential. However, when the differential locker 96 is in a locked condition, the differential locker 96 prevents rotation of one of the side gears 38 with respect to the differential cover 20. It will be appreciated that the differential locker 96 may be provided between the differential housing 18 and the other side gear 38 without altering the scope of the present invention.

Figure 4:
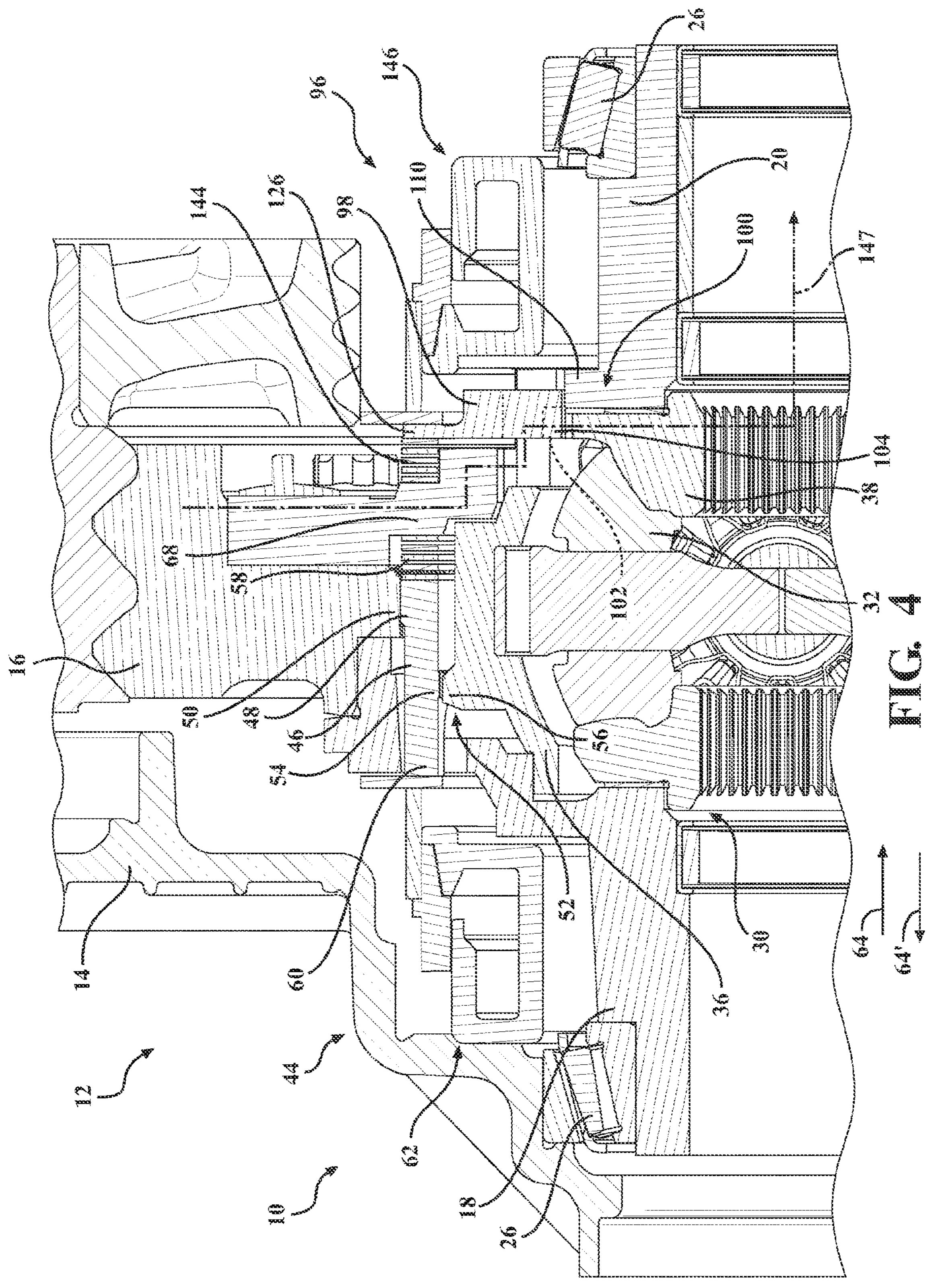
FIG. 4 is a cross-section side view of the differential disconnect and locker assembly of FIG. 3 showing the differential disconnect in the connected condition and the differential locker in a locked condition.

Referring to FIG. 2, to connect one of the side gears 38 and the differential cover 20, the differential locker 96 includes a shift collar 98 which is radially piloted and slidable axially on the outside of the differential cover 20. Referring to FIGS. 2 and 4, the shift collar 98 releasably connects with and disconnects from the side gear 38 during axial sliding of the shift collar 98 to releasably connect the differential cover 20 to the side gear 38. Depicted in FIGS. 2 and 6, the differential locker 96 comprises a releasable locker clutch 100 which preferably is defined by a set of clutch teeth or similar locking formations 102 on an outer diameter or surface of the side gear 38 and complementary locking projections 104 on an inner diameter or surface of the shift collar 98. The locking formations 102 on the side gear 38 engage with the complementary locking projections 104 on the shift collar 98 to define a mechanical connection which locks the shift collar 98 rotationally to the side gear 38. The locking formations 102 and the complementary locking projections 104 may be formed as spline teeth or other similar structures which prevents relative rotation of the differential cover 20 and the side gear 38 when engaged while permitting axial displacement of the shift collar 98 between an unlocked position of FIG. 2 and a locked position of FIG. 4.

Shown in FIG. 2, the differential cover 20 includes a pocket wall 106 extending axially from the radial wall 68 towards the end flange 24 and terminating at a stop wall 108 extending radially inward from the pocket wall 106. In addition, the differential cover 20 includes an intermediate flange 110 extending axially outward from the stop wall 108. Further, the differential cover 20 includes a connector wall 112 extending radially inward from an inner surface 114 of the intermediate flange 110 and adjoining the end flange 24. Depicted in FIG. 5, the differential cover 20 includes a plurality of spaced apart channels 116 extending in an axial direction and spaced circumferentially around the intermediate flange 110. Each channel 116 includes a channel base 118 extending circumferentially between opposing channel walls 120, 122 which extend radially inward from the outer surface of the intermediate flange 110.

Figure 5:
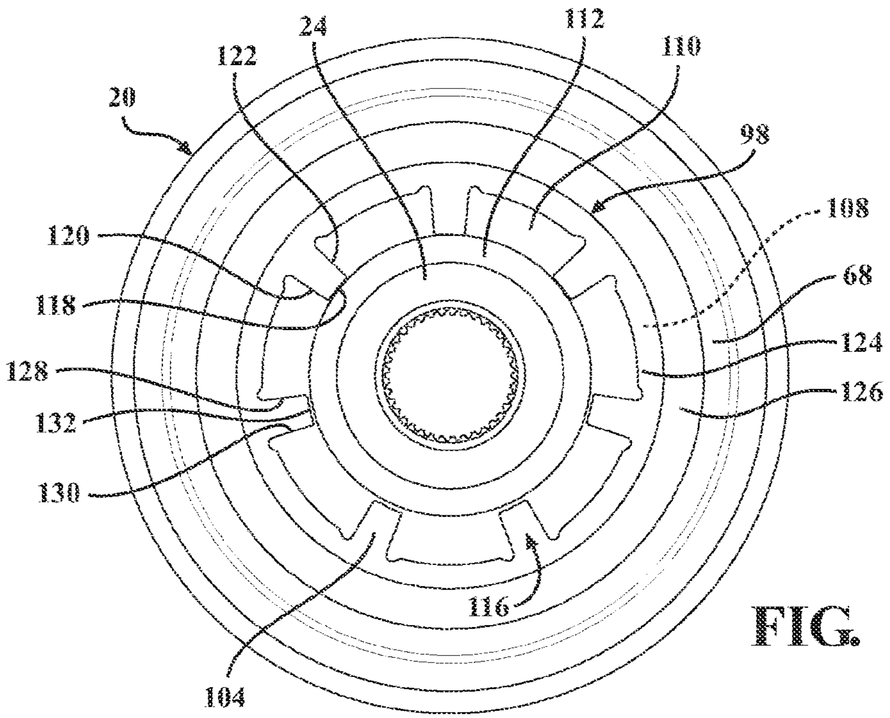
FIG. 5 is a front view of a shift collar and a portion of a differential case of the differential disconnect and locker assembly of FIG. 4.

Referring to FIGS. 2 and 5, the shift collar 98 is generally ring-shaped with a main ring 124 having an inner surface configured to slide along an outer surface of the intermediate flange 110. The shift collar 98 includes an outer rim 126 extending radially outward from an outer surface of the main ring 124. In addition, the shift collar 98 includes a plurality of circumferentially spaced-apart locking projections 104 extending radially inward from the inner surface of the main ring 124. The number of spaced apart locking projections 104 corresponds to the number of channels 116 in the differential cover 20. Further, the locking projections 104 are sized and shaped to matingly engage with a respective channel 116 when the shift collar 98 is assembled with the differential cover 20. Each locking projection 104 includes opposing projection walls 128, 130 extending radially inward from the main ring 124 and an end wall 132 extending circumferentially between the distal ends of the opposing projection walls 128, 130. It will be appreciated that the projection walls 128, 130, and the end wall 132, the channel walls 120, 122, and the channel base 118 might be tapered in the radial direction and/or the axial direction without altering the scope of the present invention. As shown in FIG. 2, the end walls 132 of the locking projections 104 are spaced radially inward of the inner surface 114 of the intermediate flange 110.

Figure 6:
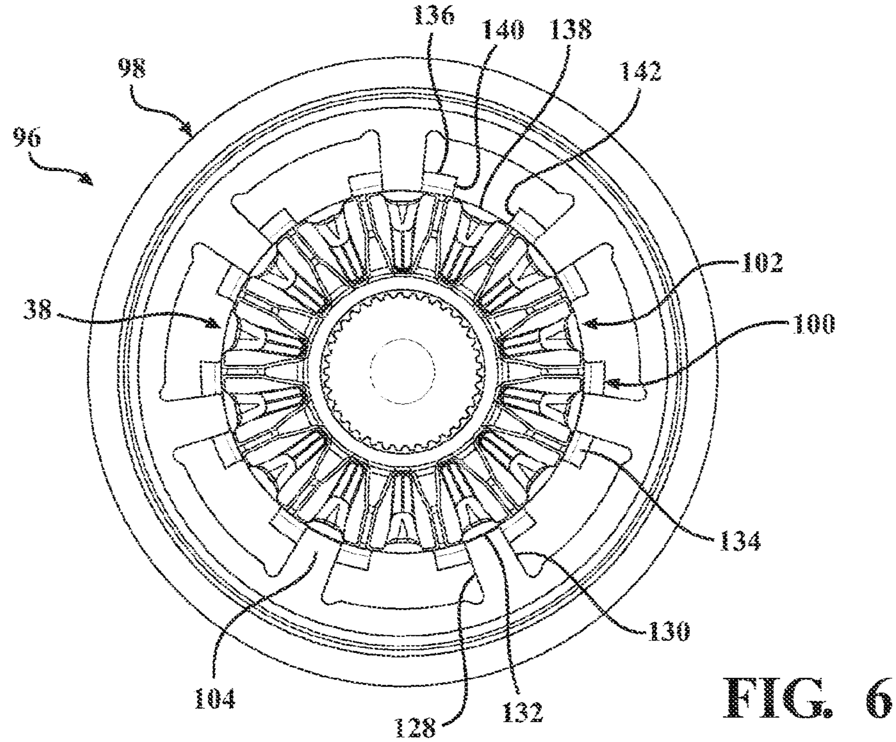
FIG. 6 is a front view of the shift collar and a side gear of the differential disconnect and locker assembly of FIG. 4.

Depicted in FIG. 6, one of the side gears 38 includes an outer ring 134 projecting radially outward from the side gear 38. In addition, the side gear 38 includes a plurality of circumferentially spaced apart locking formations 102 extending axially through the outer ring 134 and projecting radially inward from an outer surface 136 of the outer ring 134. The locking formations 102 are defined by a formation base 138 extending circumferentially between opposing formation walls 140, 142 which extend radially inward from the outer surface 136 of the outer ring 134. The locking formations 102 are sized and shaped to matingly engage with respective locking projections 104 on the shift collar 98. It will be appreciated that the formation walls 140, 142 and the formation base 138 may be tapered in the axial direction and/or the radial direction without varying the scope of the present invention. The number of locking formations 102 is equal to or greater than the number of locking projections 104. Referring to FIG. 2, the outer surface 136 of the side gear 38 is spaced radially inward of the inner surface 114 of the intermediate flange 110 on the differential cover 20 such that the side gear 38 might rotate relative to the differential cover 20. In addition, the outer surface 136 of the side gear 38 is spaced radially outward of the end walls 132 of the shift collar 98 with the formation base 138 spaced radially inward of the end walls 132 of the shift collar 98 such that locking projections 104 might matingly engage and disengage with respective locking formations 102 in the side gear 38 as the shift collar 98 is moved axially along the differential cover 20.

Referring to FIGS. 2 and 4-6, the shift collar 98 is radially piloted and slidable axially along the intermediate flange 110 of the differential cover 20 with the locking projections 104 sliding along respective channels 116 in the intermediate flange 110. The shift collar 98 is slidable axially between an unlocked position in FIG. 2 and a locked position in FIG. 4. In the unlocked position shown in FIG. 2, the locking projections 104 of the shift collar 98 are spaced axially apart from the locking formations 102 in the side gear 38, allowing the side gear 38 to rotate independently of the differential cover 20. In the locked position shown in FIG. 4, the locking projections 104 of the shift collar 98 are at least partially inserted into the locking formations 102 in the side gear 38, preventing rotation of the side gear 38 relative to the differential cover 20, which in turn rotates with the ring gear 16.

Also shown in FIG. 2, the differential locker 96 includes a locker return spring 144 (hereinafter, "locker spring") operatively coupled between the radial wall 68 of the differential cover 20 and the outer rim 126 on the shift collar 98. The locker spring 144 is configured to bias the shift collar 98 towards the unlocked position of FIG. 2 relative to the locking formations 102 on the side gear 38. The locker spring 144 acts as a biasing member to normally bias the shift collar 98 into or out of engagement with the side gear 38.

Depicted in FIG. 2, the differential locker 96 also includes a locker actuator 146 operatively coupled to the outer rim 126 and configured to selectively reposition the shift collar 98 between the unlocked position (FIG. 2) and the locked position (FIG. 4). In operation, when the locker actuator 146 is activated, the locker actuator 146 will move the shift collar 98 axially inward (arrow 64') causing the shift collar 98 to engage the locker clutch 100 between the shift collar 98 and the side gear 38, as seen in FIG. 4, allowing torque to travel from the ring gear 16, through differential cover 20, through the shift collar 98, and into the side gear 38, as illustrated by arrow 147. The locker spring 144 will move the shift collar 98 axially outward (arrow 64) when the locker actuator 146 is deactivated and will disengage the locker clutch 100 between the shift collar 98 and side gear 38 thereby allowing the side gear 38 to spin freely relative to the ring gear 16. In this embodiment, the shift collar 98 is normally biased by the locker spring 144 to the unlocked or open condition shown in FIG. 2. The locker actuator 146 in turn is activated or operated to drive the shift collar 98 axially inward (arrow 64') to the locked or closed condition of FIG. 4.

Referring to FIG. 1, to drive the shift collar 98, the locker actuator 146 includes a drive unit 148 which is stationarily supported on the stationary housing 14. The drive unit 148 includes a slide ring or pusher 150 which is axially displaceable between the positions of FIGS. 2 and 4. Preferably, the locker actuator 146 is an electromagnetic actuator 146 wherein the pusher 150 is driven axially by the drive unit 148 using an electromagnetic force. It will be understood that other types of actuators are suitable such as a motor, worm gear, a cam, a ball ramp, hydraulic or pneumatic piston or other suitable actuators. The pusher 150 in turn may axially drive an intermediate collar 152, which in turn drives a radial plate 154. A spacer 156 may be provided to control the radial and axial position of the pusher 150. The shift collar 98 contacts the radial plate 154 which is driven by the pusher 150 through the intermediate collar 152. The locker spring 144 biases the shift collar 98 towards an engaged condition with the radial plate 154.

The drive unit 148 remains stationary while the pusher 150, intermediate collar 152, and the radial plate 154 can move axially but preferably do not rotate with the shift collar 98 during rotation of the ring gear 16. The stationary housing 14 might include anti-rotation features (not shown) to prevent rotation of the radial plate 154. In addition, the drive unit 148 also includes a position sensor (not shown) to read position of a target (not shown) on the intermediate collar 152. The shift collar 98 may rotate and slide along the radial plate 154. It will be understood that other types of drive units 148 may be used to selectively displace the shift collar 98. When the drive unit 148 is deactivated, the locker spring 144 biases the shift collar 98, the radial plate 154, the intermediate collar 152, and the pusher 150 back to the position of FIGS. 1-3 to open the locker clutch 100, and when the drive unit 148 is activated, reverse movement of these components occurs to close the locker clutch 100, as shown in FIG. 4.

This system is essentially mono-stable since the shift collar 98 normally stays in the unlocked position of FIGS. 1-3 unless and until the locker actuator 146 is activated to move the shift collar 98 to the locked position of FIG. 4. When the locker actuator 146 is deactivated, the shift collar 98 then returns to the unlocked position (FIGS. 1-3) due to the biasing of the locker spring 144. Further, the normal position of FIGS. 1-3 preferably is the open unlocked position, and the active position of FIG. 4 is the closed locked position. In operation, the differential locker 96 is selectively operated to connect the differential cover 20 to the side gear 38 while the differential disconnect 44 is connecting the ring gear 16 to the gear nest 36, as illustrated in FIG. 4. It will be understood that the configuration of the shift collar 98 and locker spring 144 can be modified to operate so that a normal position is a closed locked position and an active position is an open unlocked position.

Depicted in FIG. 1, to reduce the space requirements of the locker actuator 146, the drive unit 148 preferably is positioned in an annular pocket 158 defined axially between the intermediate flange 110 of the differential cover 20 and the adjacent bearing 26 and radially outwardly of the end flange 24 of the differential cover 20. This allows the drive unit 148 to fit radially inwardly of the pusher 150, the intermediate collar 152, and the spacer 156 to reduce the radial size of the gear box 12 in this region. These components in turn are enclosed by a radial wall section 160 and an annular wall section 162 of the stationary housing 14 to define an actuator compartment 164.

Figure 7:
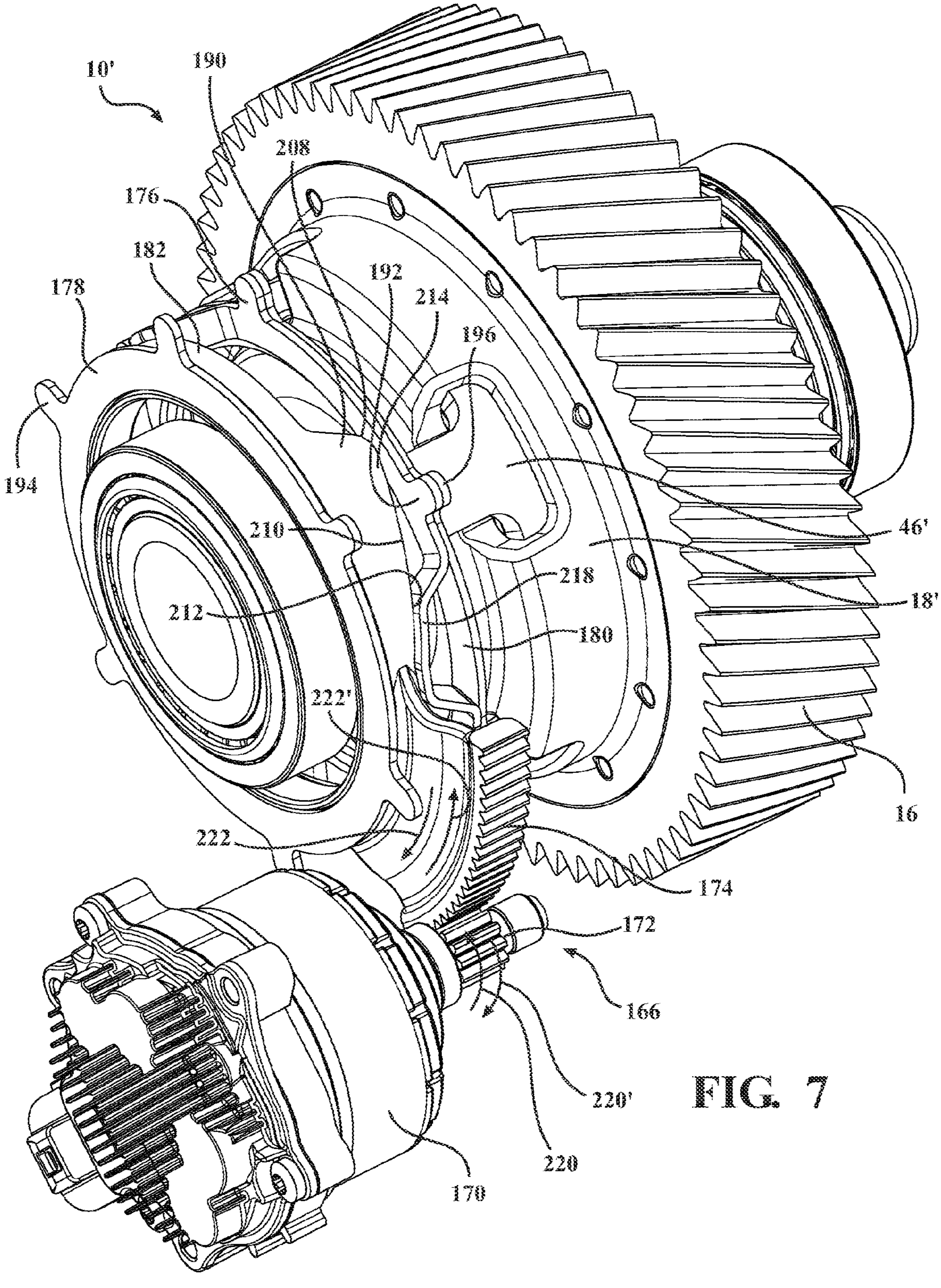
FIG. 7 is a perspective view of a differential disconnect and locker assembly in a disconnected unlocked condition with a cam actuator in a disconnected unlocked position relative to a cam ring, according to a second embodiment of the present invention.
Figure 8:
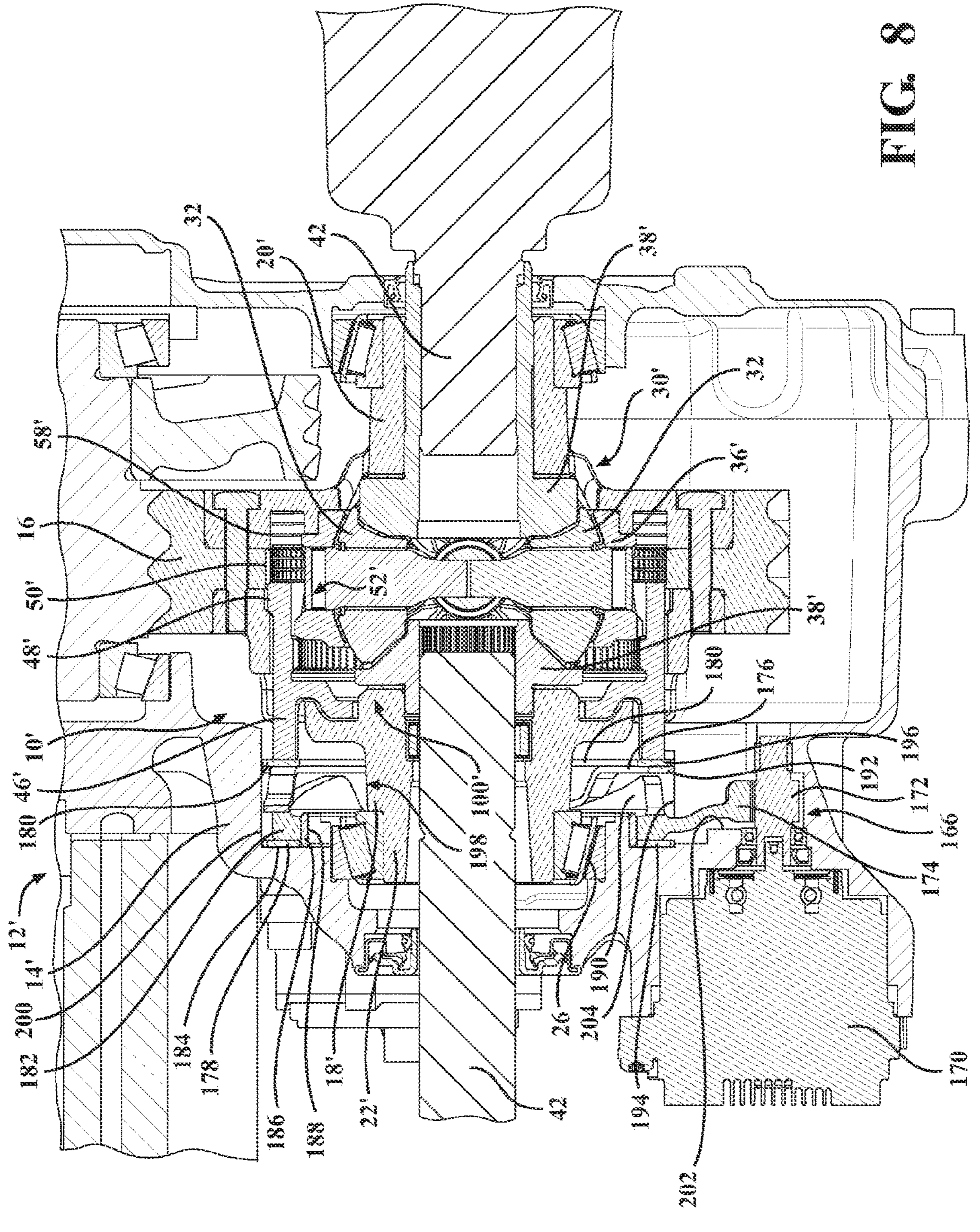
FIG. 8 is a cross-sectional side view of the differential disconnect and locker assembly of FIG. 7, showing a spline ring in a disconnected unlocked position decoupled from a gear nest and decoupled from a side gear.

A second embodiment of the disconnect/locker 10' is shown in FIGS. 7-15, which uses common parts designated by common reference numerals wherein like primed reference numerals represent similar elements as those described above. Referring to FIG. 8, in this modified gear box 12', the functions of certain components of the differential disconnect 44 and the differential locker 96 have been combined so that the disconnect/locker 10' includes a single actuator 166 in place of the disconnect actuator 62 and the locker actuator 146 of the disconnect/locker 10 described above. The actuator 166 actuates both the disconnect clutch 52' between the spline ring 46' and the gear nest 36' and the locker clutch 100' between the spline ring 46' and the side gear 38'. Only significant differences between the two embodiments are reflected in the Figures and the description below.

In more detail, the modified gear box 12' operates substantially the same as gear box 12 wherein the rotatable ring gear 16 is disposed in the stationary housing 14' and rotatably supported, both axially and radially, by the differential housing 18' and the differential cover 20', wherein the ring gear 16, the differential housing 18', and the differential cover 20' rotate together within the interior compartment of the stationary housing 14'.

The side gears 38' are selectively driven by rotation of the ring gear 16 by the pinion gears 32 operatively connected therebetween. The pinion gears 32 are rotatably connected together in the pinion assembly 30', wherein the pinion gears 32 travel about the side gears 38'. The pinion assembly 30' further includes the gear nest 36' wherein the side gears 38' are in meshed engagement with the pinion gears 32 and the ring gear 16 is engageable with the gear nest 36' such that torque can transfer through the gear nest 36', the pinion gears 32, and then the side gears 38' to thereby drive the shafts 42.

Depicted in FIG. 8, the disconnect/locker 10' is provided between the ring gear 16 and the gear nest 36', wherein the disconnect/locker 10' is selectively or intermittently operated to connect and disconnect the ring gear 16 from the gear nest 36'. The disconnect/locker 10' includes the modified spline ring 46', which is radially piloted and slidable axially on the inside of the differential housing 18' like the spline ring 46 in the previous embodiment. The spline ring 46' has an outer surface, which preferably includes radial connector projections 48' that engage with complementary connector formations 50' on the inside surface of the ring gear 16 to define a mechanical connection which locks the spline ring 46' rotationally to the ring gear 16. The connector projections 48' may be formed as spline teeth or other similar structures which lock relative rotation of the ring gear 16 and spline ring 46' when engaged while permitting axial displacement of the spline ring 46' between a disconnected unlocked position of FIGS. 8 and 11, a connected unlocked position of FIG. 13, and a connected locked position of FIG. 15. In the alternative, it will be understood that the spline ring 46' might be mechanically connected with the gear nest 36' and slidably engage and disengage from the ring gear 16.

Figure 11:
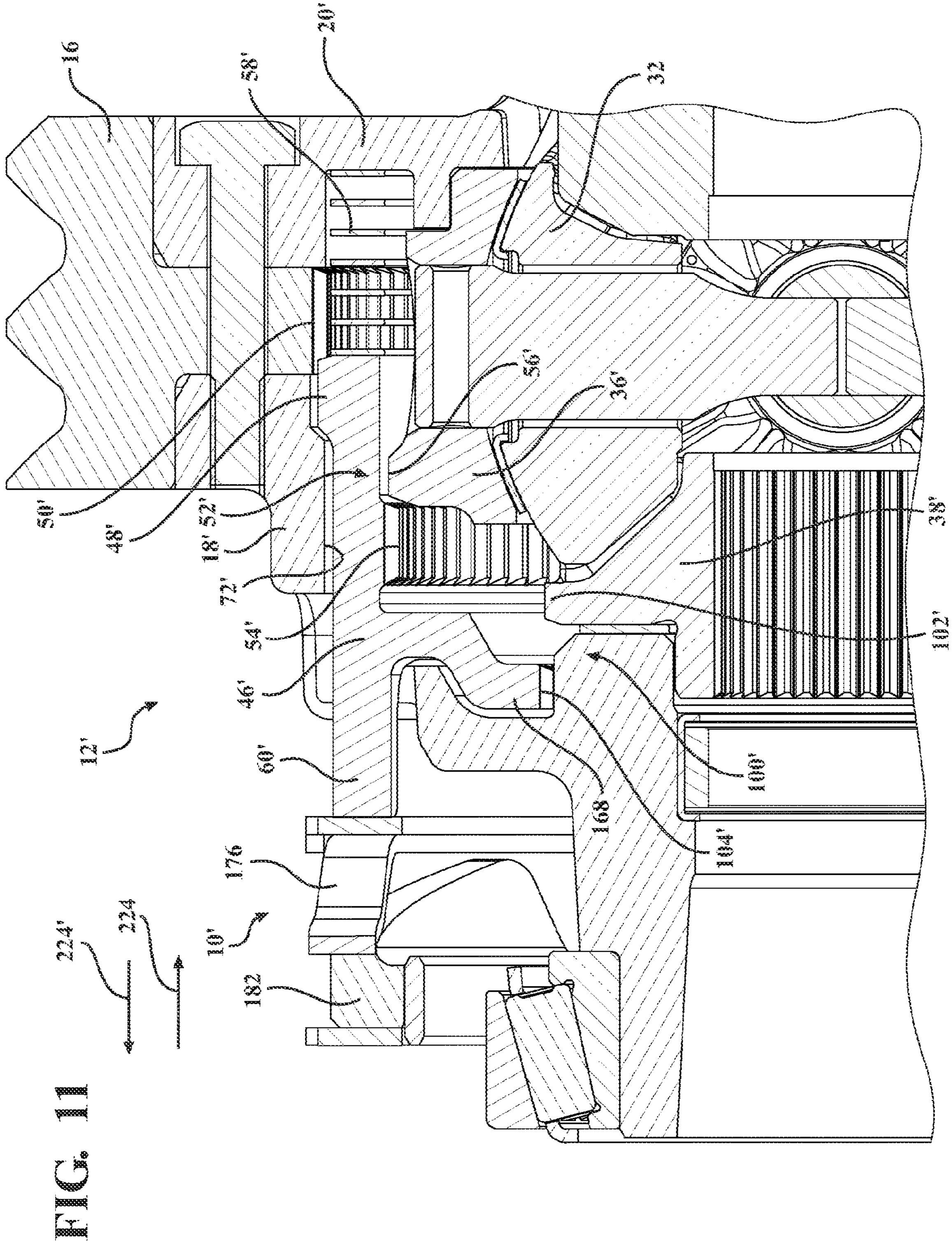
FIG. 11 is an enlarged cross-sectional side view of a portion of the differential disconnect and locker assembly in FIG. 8, showing the spline ring in the disconnected unlocked position.
Figure 13:
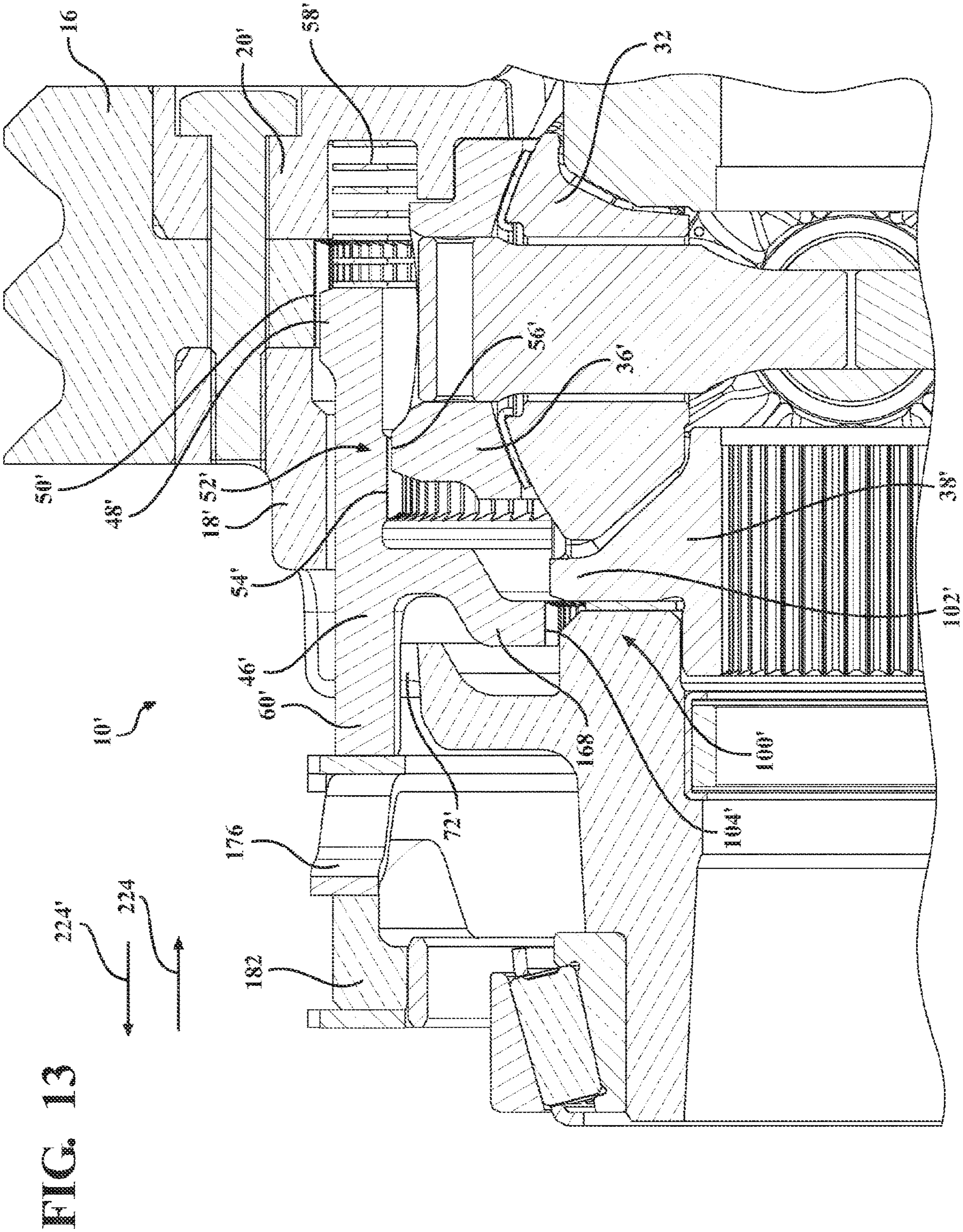
FIG. 13 is an enlarged cross-sectional side view of the differential disconnect and locker assembly of FIG. 12, showing the spline ring in a connected unlocked position engaged with the gear nest and disengaged from the side gear.

Referring to FIGS. 11 and 13, the spline ring 46' releasably connects with and disconnects from the gear nest 36' during axial sliding of the spline ring 46' to releasably connect the ring gear 16 to the gear nest 36' and pinion gears 32. In particular, the disconnect/locker 10' comprises the releasable disconnect clutch 52' which preferably is defined by a set of clutch teeth or other similar locking formations 54' on the inside diameter or surface of the spline ring 46' and complementary locking formations 56' on the outer diameter or surface of the gear nest 36'.

The disconnect/locker 10' also includes a return spring 58' operatively coupled between a proximal end of the spline ring 46' and the differential cover 20' and configured to bias the spline ring 46' towards the disconnected unlocked position (FIG. 11) relative to the locking formations 56' on the gear nest 36'. In addition, the spline ring 46' includes one or more drive arms 60' extending axially away from the proximal end of the spline ring 46' and through respective windows 72' in the differential housing 18'. The return spring 58' acts as a biasing member to normally bias the spline ring 46' into or out of engagement with the side gear 38 and into or out of engagement with the gear nest 36'.

The spline ring 46' is also configured to selectively couple the gear nest 36' and one of the side gears 38' to directly provide torque to one of the side gears 38' which provides the locker functionality. Disconnection of the gear nest 36' and the side gear 38' allows the side gear 38' to rotate independently of the gear nest 36'. The disconnect/locker 10' is normally in the disconnected unlocked condition in this embodiment with the spline ring 46' in the disconnected unlocked position shown in FIG. 11. When the disconnect/locker 10' is in the connected unlocked condition (FIGS. 12 and 13) with the spline ring 46' in the connected unlocked position, the side gears 38' can rotate freely relative to the gear nest 36' and the disconnect/locker 10' acts as a standard open differential. However, when the disconnect/locker 10' is in the connected locked condition (FIGS. 14 and 15), the spline ring 46' is in the connected locked position and prevents rotation of one of the side gears 38' relative to the gear nest 36'. It will be appreciated that the spline ring 46' may be provided between the differential cover 20' and the other side gear 38' without altering the scope of the present invention.

Figure 15:
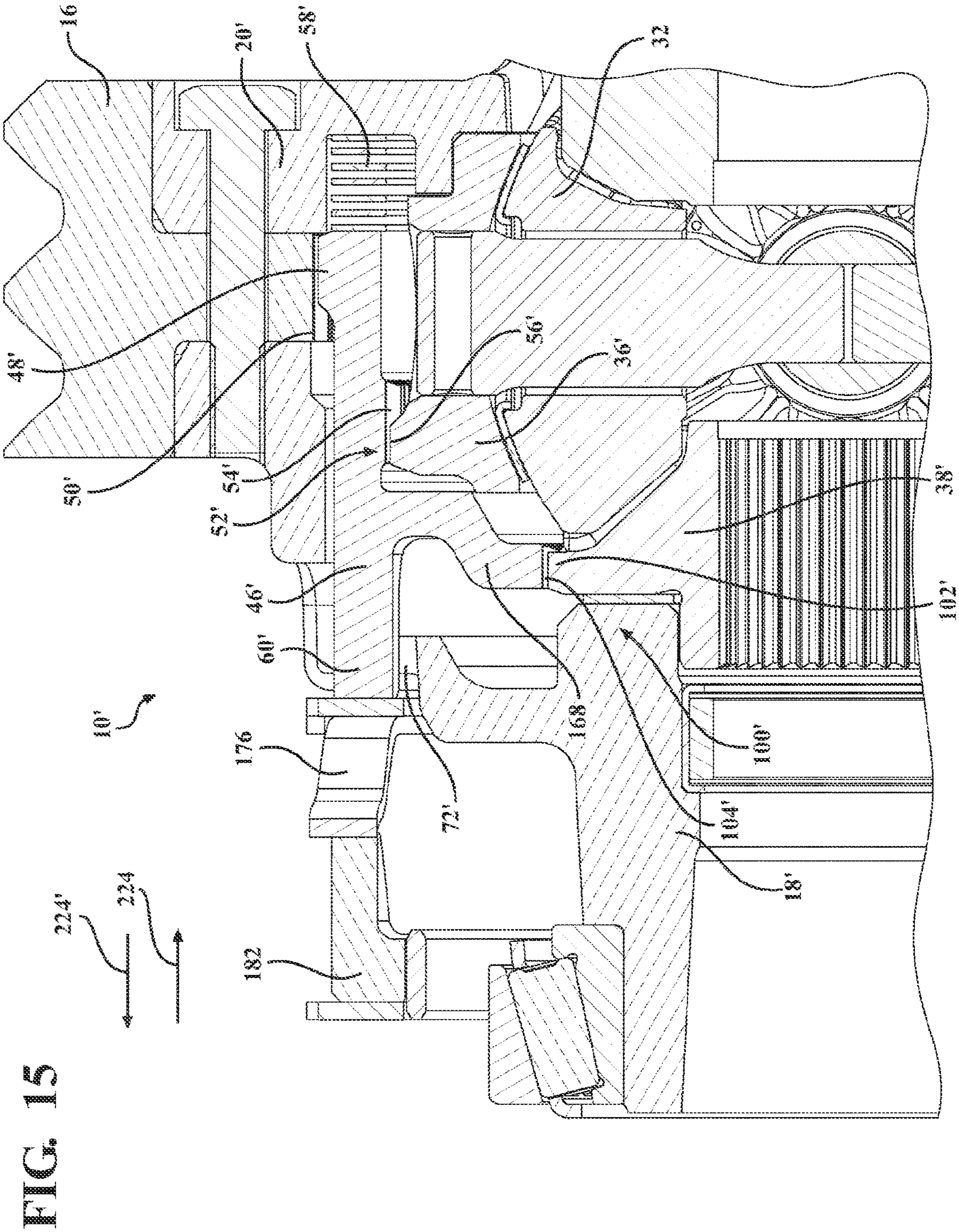
FIG. 15 is an enlarged cross-sectional side view of the differential disconnect and locker assembly of FIG. 14, showing the spline ring in a connected locked position engaged with the gear nest and engaged with the side gear.

Referring to FIG. 11, to connect one of the side gears 38' and the gear nest 36', the spline ring 46' includes a shift ring 168 extending radially inward from and fixedly coupled to the spline ring 46'. The shift ring 168 is positioned axially between the locking formations 54' and the drive arms 60' along an inner surface of the spline ring 46'. Referring to FIGS. 11 and 15, the shift ring 168 releasably connects with and disconnects from the side gear 38' during axial sliding of the spline ring 46' to releasably connect the gear nest 36' to the side gear 38'. The disconnect/locker 10' comprises the releasable locker clutch 100' which preferably is defined by a set of clutch teeth or similar locking formations 102' on an outer diameter or surface of the side gear 38' and complementary locking projections 104' on an inner diameter or surface of the shift ring 168. The locking formations 102' on the side gear 38' engage with the complementary locking projections 104' on the shift ring 168 to define a mechanical connection which locks the spline ring 46' rotationally to the side gear 38'. The locking formations 102' and the complementary locking projections 104' may be formed as spline teeth or other similar structures which lock relative rotation of the gear nest 36' and the side gear 38' when engaged while permitting axial displacement of the spline ring 46' between the disconnected unlocked position of FIG. 11, the connected unlocked position of FIG. 13, and the connected locked position of FIG. 15.

Depicted in FIGS. 7 and 8, the actuator 166 includes a motor 170, a drive gear 172, a sector gear 174, a cam ring 176, an outer thrust ring 178, and an inner thrust ring 180. The motor 170 is fixedly coupled to the stationary housing 14' and drives the drive gear 172 which is meshingly engaged with the sector gear 174. The drive gear 172 is rotatably supported within the stationary housing 14'. The sector gear 174 is fixed to a cam actuator 182 which is axially supported by the outer thrust ring 178 abutting a radial wall section 184 of the stationary housing 14' and rotatably supported by a thrust collar 186 abutting an annular ledge 188 extending axially from the radial wall section 184. The sector gear 174 includes circumferentially spaced apart cam lobes 190 for engagement with the cam ring 176.

The cam ring 176, the outer thrust ring 178, and the inner thrust ring 180 are generally ring-shaped and include circumferentially spaced apart locator tabs 192, 194, 196 projecting radially outward from a respective outer diameter or surface of the rings 176, 178, 180. Depicted in FIG. 8, the sector gear 174, the cam ring 176, the outer thrust ring 178, the inner thrust ring 180, and the thrust collar 186 are positioned within a cam cavity 198 within the stationary housing 14' defined between the outer surface of the differential housing 18', the adjacent bearing 26, as well as the radial wall section 184, the annular ledge 188, and an annular wall section 200 of the stationary housing 14'. The annular wall section 200 is spaced radially outward of the annular ledge 188.

Figure 9:
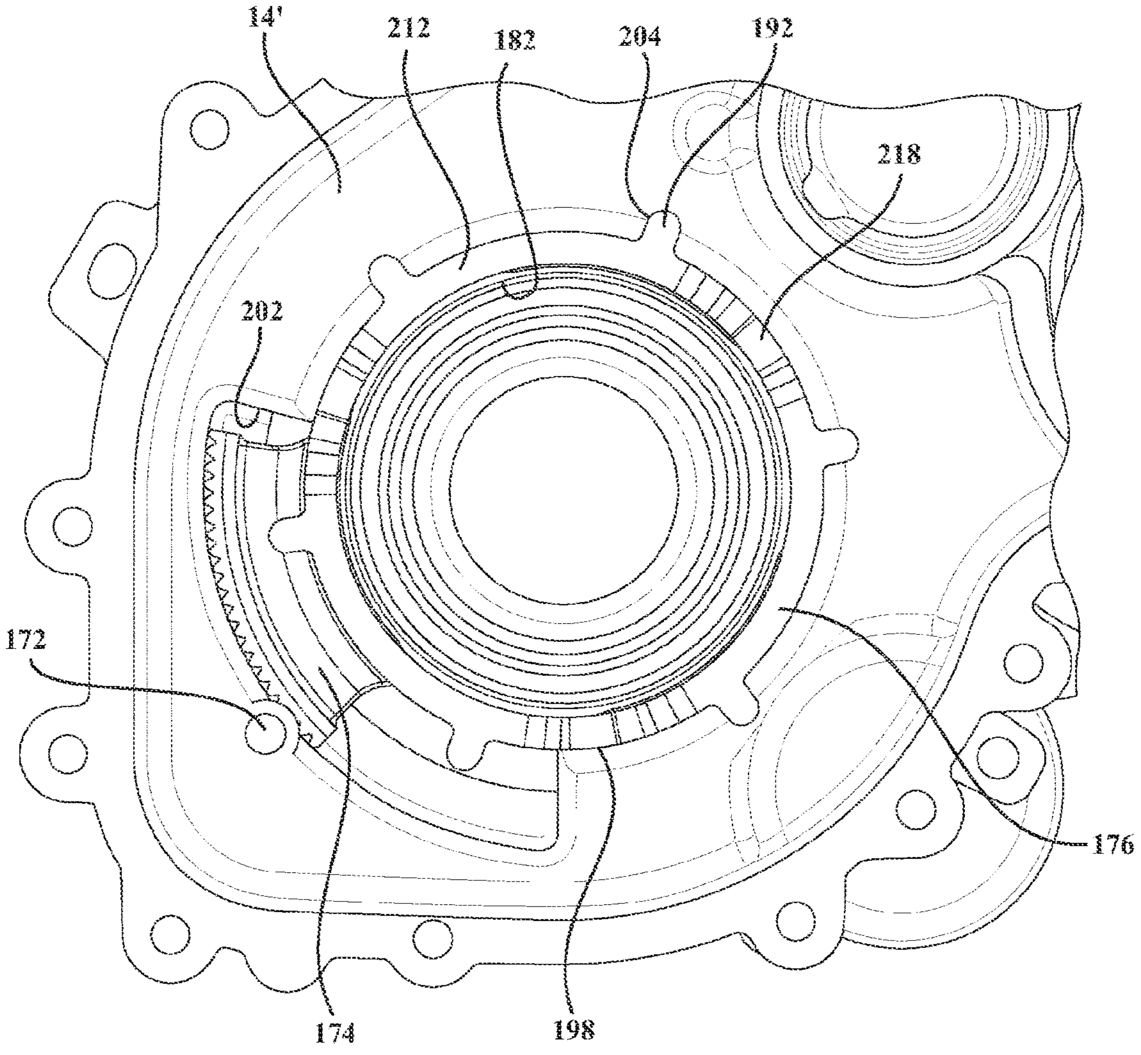
FIG. 9 is a cross-sectional end view of a portion of the differential disconnect and locker assembly of FIG. 8, showing the cam actuator and the cam ring, according to the second embodiment of the present invention.

Referring to FIGS. 8 and 9, the stationary housing 14' includes a sector cavity 202 adjoining and extending radially outward from the cam cavity 198. The cam cavity 198 also includes locator slots 204 spaced circumferentially apart around an outer diameter or surface of the cam cavity 198 and extending in an axial direction. The locator slots 204 are sized and shaped to matingly engage with the locator tabs 192, 194, 196 on the cam ring 176, the outer thrust ring 178, and the inner thrust ring 180 preventing rotation of the rings 176, 178, 180 while allowing axial movement of the cam ring 176 and the inner thrust ring 180 along the locator slots 204.

Depicted in FIG. 8, the outer thrust ring 178 abuts the radial wall section 184 of the stationary housing 14' with the locator tabs 194 positioned within the respective locator slots 204. The cam actuator 182 is positioned axially inward from the outer thrust ring 178 with the sector gear 174 positioned within the sector cavity 202. The sector gear 174 is rotatable within the sector cavity 202. The cam ring 176 is positioned axially inward from the cam actuator 182. The inner thrust ring 180 is positioned axially inward of the cam ring 176 and axially outward of the spline ring 46'. In addition, the cam actuator 182, the cam ring 176, and the outer and inner thrust rings 178, 180 are positioned radially outward of the end flange 22' of the differential housing 18'. The outer and inner thrust rings 178, 180 and the cam ring 176 are locked rotationally to the stationary housing 14' by the locator tabs 192, 194, 196 positioned within the locator slots 204. However, the inner thrust ring 180 and the cam ring 176 are slidable axially within the stationary housing 14' between a disconnected unlocked position of FIG. 11 and a connected locked position of FIG. 15 since the locator tabs 192, 196 are axially slidable along the respective locator slots 204. The return spring 58' biases the spline ring 46', the inner thrust ring 180, the cam ring 176, the cam actuator 182, and the outer thrust ring 178 axially outward towards the stationary housing 14'. As such, the return spring 58' biases the spline ring 46' towards the disconnected unlocked position relative to the disconnect clutch 52' and the locker clutch 100'.

Figure 10:
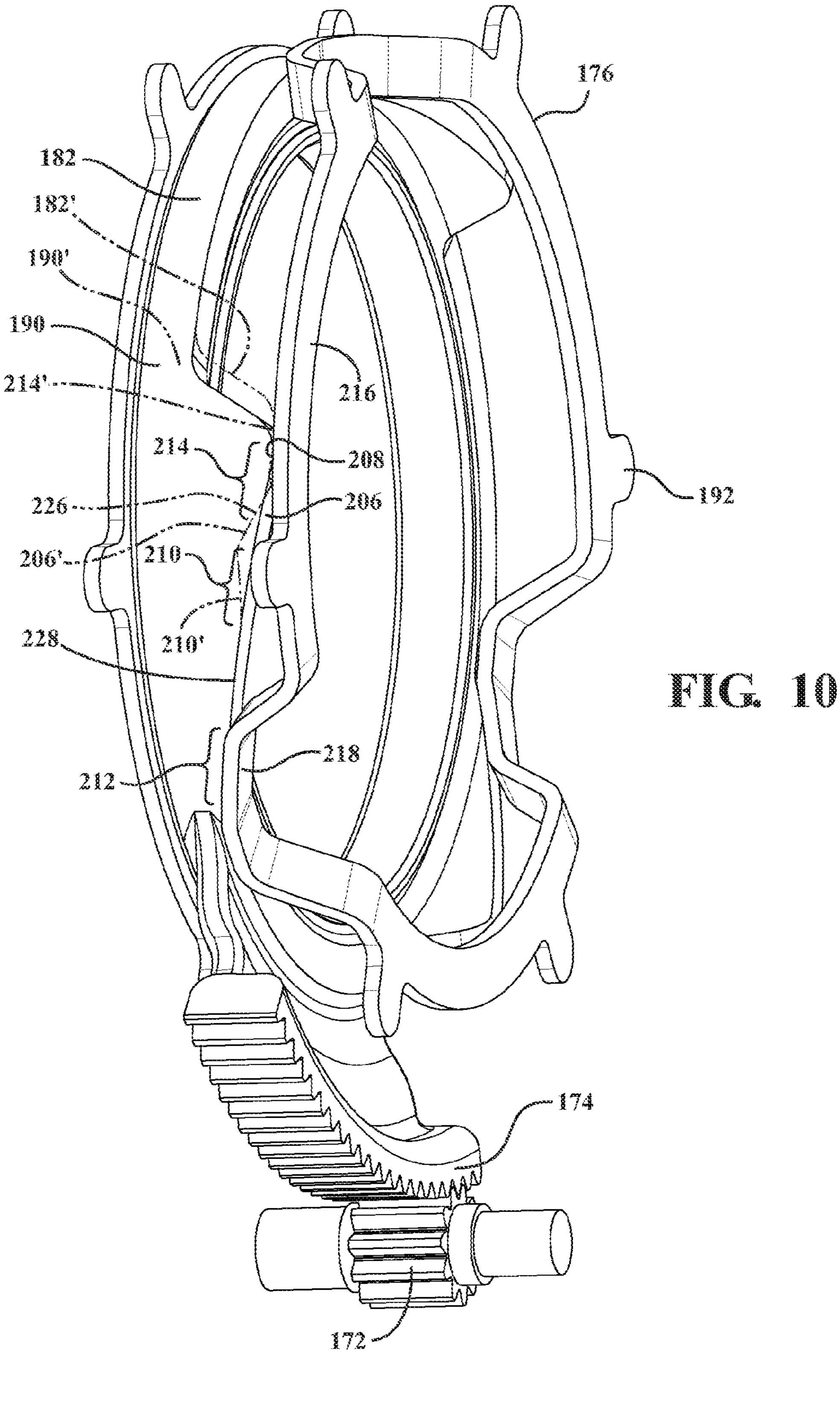
FIG. 10 is a perspective side view of the cam actuator and the cam ring of FIG. 9, showing the cam actuator in the disconnected unlocked position relative to the cam ring.

Referring to FIG. 10, the cam lobes 190 of the cam actuator 182 include a ramp portion 206 adjacent to a cam peak 208 with the cam lobes 190 projecting axially towards the cam ring 176. The ramp portion 206 includes an intermediate portion 210 spaced circumferentially between a base portion 212 and a peak portion 214 adjacent the cam peak 208. The peak portion 214 optionally includes the cam peak 208. The cam ring 176 is generally ring shaped and includes a ring base 216 and circumferentially spaced apart cam ramps 218 projecting away from the ring base 216 and axially towards the cam actuator 182. The number of cam ramps 218 generally corresponds to the number of cam lobes 190 on the cam actuator 182. The cam lobes 190 on the cam actuator 182 and the cam ramps 218 of the cam ring 176 are sized and shaped such that rotation of the cam actuator 182 causes the cam lobes 190 to axially displace the cam ring 176 which further causes the spline ring 46' to be moved axially. The axial position of the spline ring 46' is controlled by the contact of the cam ramps 218 with the respective ramp portion 206 of the cam actuator 182. In addition, the ring base 216 is configured to provide axial clearance for the cam peak 208 as the cam actuator 182 is rotated relative to the cam ring 176. The intermediate portion 210 and the peak portion 214 might be inclined portions such that the actuator 166 is mono-stable, as further described below.

In this embodiment, the spline ring 46' is normally biased by the return spring 58' to the disconnected unlocked condition (i.e., the open condition) shown in FIG. 11. The actuator 166 in turn is activated or operated to rotate the cam actuator 182 and cause the cam ring 176 to move spline ring 46' axially to the connected unlocked position (FIGS. 12 and 13) which engages the disconnect clutch 52' and allows torque to be transferred from the ring gear 16, through the spline ring 46', and into the gear nest 36'. Additionally, the actuator 166 also causes the cam ring 176 to move the spline ring 46' axially to the connected locked position (FIGS. 14 and 15) which in turn engages the locker clutch 100' which rotationally fixes the side gear 38' to the gear nest 36' and prevents rotation of the side gear 38' relative to the gear nest 36'. Therefore, a single actuator 166 is capable of actuating the disconnect clutch 52' between the ring gear 16 and gear nest 36' as well as the locker clutch 100' between the side gear 38' and gear nest 36'.

Figure 12:
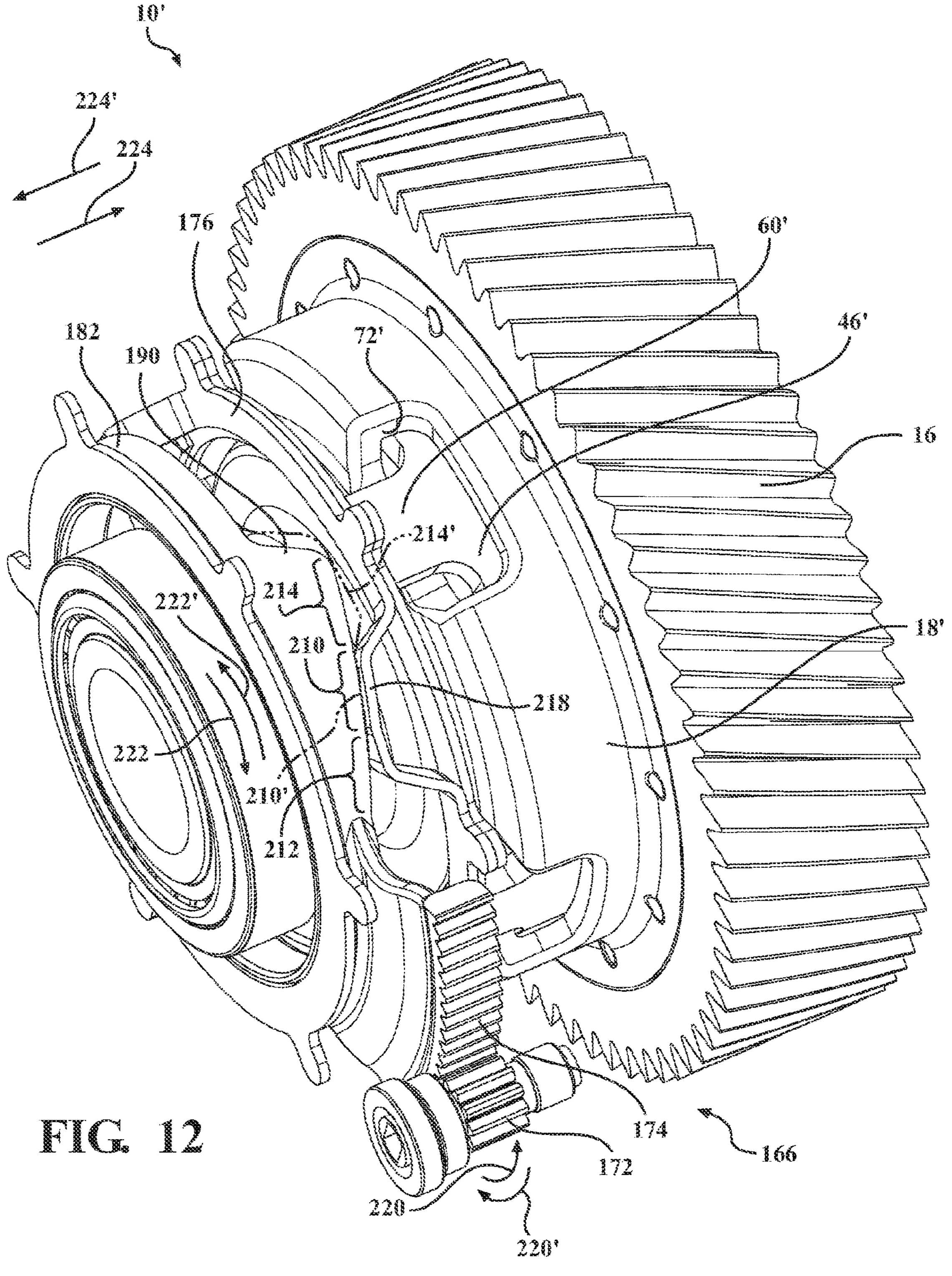
FIG. 12 is a perspective view of a portion of the differential disconnect and locker assembly of FIG. 7, showing the cam actuator in a connected unlocked position relative to the cam ring.

Initially, the disconnect/locker 10' is in the disconnected unlocked condition shown in FIGS. 7, 8, and 11 with the disconnect clutch 52' disengaged, the locker clutch 100' unlocked, the spline ring 46' in the disconnected unlocked position, and the base portion 212 of the cam lobes 190 engaged with the cam ramps 218. When the disconnect/locker 10' is in the disconnected unlocked condition, the gear nest 36' spins freely relative to the ring gear 16 and the side gears 38' spins freely relative to the gear nest 36'. Referring to FIG. 7, to selectively engage the disconnect clutch 52', the actuator 166 activates the motor 170 which drives the drive gear 172 in a forward rotational direction 220 causing the sector gear 174 and the attached cam actuator 182 to rotate in a first rotational direction 222. It will be appreciated that the forward rotational direction 220 may be either clockwise or counterclockwise rotational directions without altering the scope of the present invention. In addition, it will be appreciated that the first rotational direction 222 may be either clockwise or counterclockwise rotational directions without altering the scope of the present invention. Referring to FIGS. 12 and 13, the cam actuator 182 is rotated in the first rotational direction 222 until the intermediate portion 210 of the cam lobes 190 engages with the respective cam ramps 218 which moves the cam ring 176 axially in an inward direction (arrow 224). The axial movement of the cam ring 176 in the inward direction (arrow 224) moves the spline ring 46' axially in the inward direction (arrow 224) to the connected unlocked position (FIG. 13) causing the spline ring 46' to engage the disconnect clutch 52' between the spline ring 46' and the gear nest 36', allowing torque to travel from the ring gear 16, through the spline ring 46', and into the gear nest 36'.

After the disconnect/locker 10' is in the connected unlocked condition, the actuator 166 maintains the motor 170 at a predetermined first rotational position which retains the disconnect/locker 10' in the connected unlocked condition with the disconnect clutch 52' in the engaged condition, the locker clutch 100' in the disengaged condition, the spline ring 46' in the connected unlocked position, and the intermediate portions 210 of the cam lobes 190 engaged with the cam ramps 218 of the cam ring 176. The locker clutch 100' is maintained in the disengaged condition while the disconnect clutch 52' is engaged since the peak portion 214 of the cam lobes 190 are spaced apart from the cam ramps 218. It will be appreciated that the motor 170 might include a motor encoder (not shown) configured to provide feedback to the actuator 166 indicative of the rotational position of the motor 170. The actuator 166 might be configured to be mono-stable in the connected unlocked condition such that the motor 170 is held at the first predetermined rotational position to maintain the disconnect/locker 10' in the connected unlocked condition. The actuator 166 is mono-stable at the connected unlocked condition since the intermediate portion 210 is inclined. As such, when the disconnect/locker 10' is in the connected unlocked condition and the motor 170 is deactivated (i.e., power is removed from the motor 170), the return spring 58' will back drive the motor 170 due to the incline in the intermediate portion 210. Thus, the disconnect/locker 10' is maintained in the connected unlocked condition while the actuator 166 provides power to the motor 170 and the disconnect/locker 10' is automatically returned to the disconnected unlocked condition by the return spring 56' when the motor 170 is deactivated.

Figure 14:
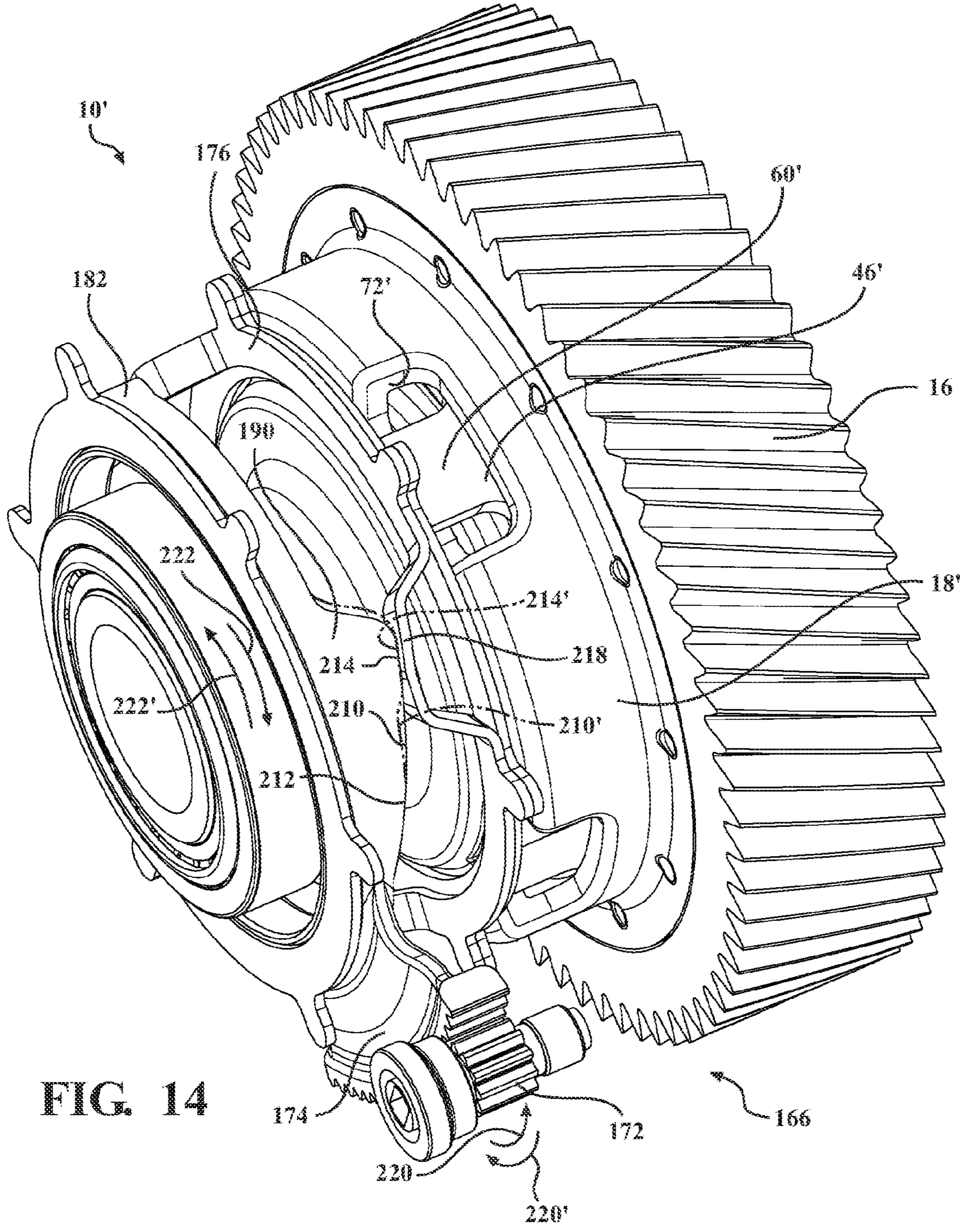
FIG. 14 is a perspective view of a portion of the differential disconnect and locker assembly of FIG. 12, showing the cam actuator in a connected locked position relative to the cam ring.

The disconnect/locker 10' may be placed in the connected locked condition by the actuator 166 when the disconnect/locker 10' is in the connected unlocked condition by engaging the locker clutch 100'. Referring to FIG. 14, to engage the locker clutch 100', the actuator 166 activates the motor 170 which drives the drive gear 172 in the forward rotational direction 220 causing the sector gear 174 and the attached cam actuator 182 to rotate in the first rotational direction 222 causing the peak portion 214 of the cam lobes 190 to engage with the respective cam ramps 218. Aligning the peak portion 214 with the respective cam ramps 218 moves the cam ring 176 axially in the inward direction (arrow 224), which in turn moves the spline ring 46' axially in the inward direction (arrow 224) to the connected locked position (FIGS. 14 and 15) causing the spline ring 46' to engage the locker clutch 100' between the shift ring 168 and the side gear 38'. The engagement of the disconnect clutch 52' is maintained between the spline ring 46' and the gear nest 36' while the spline ring 46' is repositioned to engage the locker clutch 100'. When the spline ring 46' is in the connected locked position (FIGS. 14 and 15), the spline ring 46' allows torque to travel from the ring gear 16, through the spline ring 46', and into the gear nest 36' through the disconnect clutch 52' while also allowing torque to travel from the ring gear 16, through the spline ring 46', and into the side gear 38' through the locker clutch 100'. After the disconnect/locker 10' is in the connected locked condition, the actuator 166 maintains the motor 170 at a second predetermined rotational position which retains the disconnect clutch 52' in the engaged condition and retains the locker clutch 100' in the engaged condition.

The actuator 166 might be configured to be mono-stable such that the motor 170 is held at the first predetermined rotational position to maintain the disconnect/locker 10' in the connected locked condition. The actuator 166 is mono-stable at the connected locked condition since the peak portion 214 is inclined. As such, when the disconnect/locker 10' is in the connected locked condition and the motor 170 is deactivated, the return spring 58' will back drive the motor 170 due to the incline in the peak portion 214. Thus, the disconnect/locker 10' is maintained in the connected locked condition while the actuator 166 provides power to the motor 170 and the disconnect/locker 10' is automatically returned to the connected unlocked condition by the return spring 56' when the motor 170 is deactivated.

Referring to FIGS. 14 and 15, to disengage the locker clutch 100' while maintaining engagement of the disconnect clutch 52', the actuator 166 deactivates the motor 170. After the motor 170 is deactivated, the return spring 58' back drives the motor 170 which drives the drive gear 172 in a reverse rotational direction 220' to drive the sector gear 174 and the attached cam actuator 182 in a second rotational direction 222'. The forward and reverse rotational directions 220, 220' are opposing rotational directions. Likewise, the first and second rotational directions 222, 222' are opposing rotational directions. The cam actuator 182 is rotated in the second rotational direction 222' until the intermediate portions 210 of the cam lobes 190 circumferentially align with respective cam ramps 218 of the cam ring 176. The return spring 58' moves the cam ring 176, the inner thrust ring 178, and the spline ring 46' axially in an outward direction (arrow 224') to the connected unlocked position (FIGS. 12 and 13) causing the spline ring 46' to move to the connected unlocked position which disengages the locker clutch 100' while maintaining the disconnect clutch 52' in the engaged condition. When the spline ring 46' is in the connected unlocked position, torque is allowed to travel from the ring gear 16, through the spline ring 46', and into the gear nest 36' through the disconnect clutch 52' while allowing the side gears 38' to spin relative to the gear nest 36'. After the disconnect/locker 10' is in the connected unlocked condition, the actuator 166 selectively activates the motor 170 which retains the motor 170 in the first predetermined rotational position, the disconnect clutch 52' in the engaged condition, and the locker clutch 100' in the disengaged condition.

Referring to FIGS. 12 and 13, to disengage the disconnect clutch 52' between the spline ring 46' and the gear nest 36' while the locker clutch 100' is disengaged, the actuator 166 deactivates the motor 170 which allows the return spring 58' to back drive the motor 170 and drive the drive gear 172 in the reverse rotational direction 220' causing the sector gear 174 and the attached cam actuator 182 to rotate in the second rotational direction 222'. The cam actuator 182 is rotated in the second rotational direction 222' until the base portions 212 of the cam lobes 190 circumferentially align with respective cam ramps 218 of the cam ring 176. In response to the base portions 212 of the cam lobes 190 being rotationally repositioned to align with the cam ramps 218, the return spring 58' causes the cam ring 176, the inner thrust ring 178, and the spline ring 46' to move axially in an outward direction (arrow 224') to the disconnected unlocked position (FIGS. 7 and 11) causing the spline ring 46' to move to the disconnected unlocked position which disengages the disconnect clutch 52' between the spline ring 46' and the gear nest 36', thereby allowing the gear nest 36' to spin freely relative to the ring gear 16. After the disconnect/locker 10' is in the disconnected unlocked condition, the actuator 166 maintains the motor 170 in the deactivated state which retains the disconnect clutch 52' in the disengaged condition and retains the locker clutch 100' in the unlocked condition.

A third embodiment of the disconnect/locker 10' is shown in FIGS. 10-15, which uses common parts designated by common reference numerals wherein like primed reference numbers represent similar elements as those described above. In this modified disconnect/locker 10', the actuator 166 is configured to be bi-stable such that the disconnect/locker 10' is retained in a current state until the actuator 166 activates the motor 170 to reposition the cam actuator 182' between the connected unlocked condition and the connected locked condition. Only significant differences between the embodiments are reflected in the Figures and the description below.

Referring to FIG. 10, the cam actuator 182' includes a modified ramp portion 206' on the cam lobes 190' which includes an intermediate flat portion 210' and a peak flat portion 214'. The flat portions 210', 214' allow the actuator 166 to be bi-stable, i.e., the flat portions 210', 214' prevent the return spring 56' from back driving the motor 170 when the motor 170 is deactivated and the disconnect/locker 10' is in the connected unlocked condition and the connected locked condition, respectively. In addition, the modified ramp portion 206' includes a ramp portion 228 extending circumferentially between the intermediate flat portion 210' and the peak flat portion 214'. Further, the ramp portion 206' also includes a ramp portion 226 extending circumferentially between the base portion 212 and the intermediate flat portion 210'.

Initially, the disconnect/locker 10' is in the disconnected unlocked condition shown in FIGS. 7, 8, and 11 with the disconnect clutch 52' disengaged, the locker clutch 100' unlocked, the spline ring 46' in the disconnected unlocked position, and the base portion 212 of the cam lobes 190' engaged with the cam ramps 218. To selectively engage the disconnect clutch 52' when the disconnect/locker 10' is in the disconnected unlocked condition, the actuator 166 activates the motor 170 which drives the drive gear 172 in the forward rotational direction 220 causing the sector gear 174 and the attached cam actuator 182' to rotate in the first rotational direction 222. Referring to FIGS. 12 and 13, the cam actuator 182' is rotated in the first rotational direction 222 until the intermediate flat portion 210' of the cam lobes 190' engages with the respective cam ramps 218 which moves the cam ring 176 axially in an inward direction (arrow 224). The axial movement of the cam ring 176 in the inward direction (arrow 224) moves the spline ring 46' axially in the inward direction (arrow 224) to the connected unlocked position (FIG. 13) causing the spline ring 46' to engage the disconnect clutch 52' between the spline ring 46' and the gear nest 36', allowing torque to travel from the ring gear 16, through the spline ring 46', and into the gear nest 36'.

After the disconnect/locker 10' is in the connected unlocked condition, the actuator 166' deactivates the motor 170 at the predetermined first rotational position which retains the disconnect/locker 10' in the connected unlocked condition with the disconnect clutch 52' in the engaged condition, the locker clutch 100' in the disengaged condition, the spline ring 46' in the connected unlocked position, and the intermediate flat portions 210' of the cam lobes 190' engaged with the cam ramps 218 of the cam ring 176. The locker clutch 100' is maintained in the disengaged condition while the disconnect clutch 52' is engaged since the peak flat portion 214' of the cam lobes 190' are spaced apart from the cam ramps 218. The contour of the intermediate flat portions 210' engaged with the cam ramps 218 prevents the return spring 58' from back driving the motor 170 while the motor 170 is deactivated which allows the actuator 166 to be bi-stable in the connected unlocked condition. As such, the disconnect/locker 10' is retained in the connected unlocked condition until the actuator 166 activates the motor 170 to reposition the disconnect/locker 10' to one of the connected locked condition or the disconnected unlocked condition.

The disconnect/locker 10' may be placed in the connected locked condition by the actuator 166 when the disconnect/locker 10' is in the connected unlocked condition by engaging the locker clutch 100'. Referring to FIG. 14, to engage the locker clutch 100', the actuator 166 activates the motor 170 which drives the drive gear 172 in the forward rotational direction 220 causing the sector gear 174 and the attached cam actuator 182' to rotate in the first rotational direction 222 causing the peak flat portion 214' of the cam lobes 190' to engage with the respective cam ramps 218. Aligning the peak flat portion 214' with the respective cam ramps 218 moves the cam ring 176 axially in the inward direction (arrow 224), which in turn moves the spline ring 46' axially in the inward direction (arrow 224) to the connected locked position (FIGS. 14 and 15) causing the spline ring 46' to engage the locker clutch 100' between the shift ring 168 and the side gear 38'. The engagement of the disconnect clutch 52' is maintained between the spline ring 46' and the gear nest 36' while the spline ring 46' is repositioned to engage the locker clutch 100'. When the spline ring 46' is in the connected locked position (FIGS. 14 and 15), the spline ring 46' allows torque to travel from the ring gear 16, through the spline ring 46', and into the gear nest 36' through the disconnect clutch 52' while also allowing torque to travel from the ring gear 16, through the spline ring 46', and into the side gear 38' through the locker clutch 100'. After the disconnect/locker 10' is in the connected locked condition, the actuator 166 deactivates the motor 170 at the second predetermined rotational position which retains the disconnect clutch 52' in the engaged condition and retains the locker clutch 100' in the engaged condition. The contour of the peak flat portions 214' engaged with the cam ramps 218 prevents the return spring 58' from back driving the motor 170 while the motor 170 is deactivated which allows the actuator 166 to be bi-stable in the connected locked condition. As such, the disconnect/locker 10' is retained in the connected locked condition until the actuator 166 activates the motor 170 to reposition the disconnect/locker 10' to one of the connected unlocked condition or the disconnected unlocked condition.

Referring to FIGS. 14 and 15, to disengage the locker clutch 100' while maintaining engagement of the disconnect clutch 52', the actuator 166 activates the motor 170 which drives the drive gear 172 in a reverse rotational direction 220' to drive the sector gear 174 and the attached cam actuator 182' in a second rotational direction 222'. The cam actuator 182' is rotated in the second rotational direction 222' until the intermediate flat portions 210' of the cam lobes 190' circumferentially align with respective cam ramps 218 of the cam ring 176. The return spring 58' moves the cam ring 176, the inner thrust ring 178, and the spline ring 46' axially in an outward direction (arrow 224') to the connected unlocked position (FIGS. 12 and 13) causing the spline ring 46' to move to the connected unlocked position which disengages the locker clutch 100' while maintaining the disconnect clutch 52' in the engaged condition. When the spline ring 46' is in the connected unlocked position, torque is allowed to travel from the ring gear 16, through the spline ring 46', and into the gear nest 36' through the disconnect clutch 52' while allowing the side gears 38' to spin relative to the gear nest 36'. After the disconnect/locker 10' is in the connected unlocked condition, the actuator 166 deactivates the motor 170 which retains the motor 170 in the first predetermined rotational position, the disconnect clutch 52' in the engaged condition, and the locker clutch 100' in the disengaged condition. The contour of the intermediate flat portions 210' engaged with the cam ramps 218 prevents the return spring 58' from back driving the motor 170 while the motor 170 is deactivated which allows the actuator 166 to be bi-stable in the connected unlocked condition Referring to FIGS. 12 and 13, to disengage the disconnect clutch 52' between the spline ring 46' and the gear nest 36' while the locker clutch 100' is disengaged, the actuator 166 activates the motor 170 which drives the drive gear 172 in the reverse rotational direction 220' causing the sector gear 174 and the attached cam actuator 182' to rotate in the second rotational direction 222'. The cam actuator 182' is rotated in the second rotational direction 222' until the base portions 212 of the cam lobes 190' circumferentially align with respective cam ramps 218 of the cam ring 176. In response to the base portions 212 of the cam lobes 190' being rotationally repositioned to align with the cam ramps 218, the return spring 58' causes the cam ring 176, the inner thrust ring 178, and the spline ring 46' to move axially in an outward direction (arrow 224') to the disconnected unlocked position (FIGS. 7 and 11) causing the spline ring 46' to move to the disconnected unlocked position which disengages the disconnect clutch 52' between the spline ring 46' and the gear nest 36', thereby allowing the gear nest 36' to spin freely relative to the ring gear 16. After the disconnect/locker 10' is in the disconnected unlocked condition, the actuator 166 deactivates the motor 170 which retains the disconnect clutch 52' in the disengaged condition and retains the locker clutch 100' in the unlocked condition.

It will be appreciated that the actuator 166 might be configured to be bi-stable or mono-stable in the connected unlocked condition and in the connected locked condition. For example, the actuator 166 might be configured to be bi-stable in the connected unlocked condition and mono-stable in the connected locked condition by including the intermediate flat portion 210' and the inclined peak portion 214 as part of the ramp portion 206, 206'. In an alternative embodiment, the actuator 166 might be configured to be mono-stable in the connected unlocked condition and bi-stable in the connected locked condition by including the inclined intermediate portion 210 and the peak flat portion 214' as part of the ramp portion 206, 206'.

As discussed above, the differential disconnect and locker assembly 10, 10' includes a disconnect clutch 52, 52' configured to selectively connect the ring gear 16 to the differential gear nest 36, 36' so that torque can transfer from the ring gear 16 through the gear nest 36, 36', the pinion gears 32, and then the side gears 38, 38' to thereby drive the shafts 42. Disengaging the disconnect clutch 52, 52' between the spline ring 46, 46' and the gear nest 36, 36' allows the ring gear 16, differential housing 18, 18', bearings 26, and the rest of the gear box 12, 12' to stop spinning while the wheels of the vehicle are spinning. In addition, the differential disconnect and locker assembly 10, 10' includes a locker clutch 100, 100' configured to selectively lock the differential housing 18, 18' or the differential cover 20 to one of the side gears 38, 38', preventing rotation of the side gear 38, 38' relative to the connected differential housing 18, 18' or differential cover 20.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A differential disconnect and locker assembly for a vehicle comprising:

a stationary housing;

a rotatable ring gear rotatably supported by the stationary housing;

a pinion gear assembly comprising a plurality of pinion gears drivingly connectable to the ring gear;

a plurality of side gears rotatably disposed within the stationary housing and meshing with the pinion gears such that the side gears and the pinion gears rotate together;

a differential housing and a differential cover rotatably supported on the stationary housing, wherein the ring gear rotates together with at least one of the differential housing and the differential cover, wherein disconnection of the ring gear from the pinion gear assembly allows the ring gear, the differential housing, and the differential cover to stop spinning while the side gears are spinning;

a differential disconnect assembly operatively connected between respective surfaces of the ring gear and the pinion gear assembly such that the ring gear, the pinion gears, and the side gears when connected rotate together, the differential disconnect assembly being actuatable to operatively disconnect the ring gear from the pinion gear assembly to disconnect torque transmission between the ring gear and the pinion gears and prevent driving rotation of the ring gear by the pinion gears; and a differential locker slidably coupled to one or more of the differential housing and the differential cover and operatively connected to one of the side gears such that the one or more of the differential housing and the differential cover and the one of the side gears when connected rotate together, the differential locker being actuatable to operatively disconnect the one or more of the differential housing and the differential cover from the one of the side gears allowing the one of the side gears to rotate relative to the one or more of the differential housing and the differential cover;

the pinion gear assembly includes a gear nest supported radially and axially by the differential housing and the differential cover, the gear nest can spin freely relative to both the differential housing and the differential cover, and the differential disconnect assembly connecting the ring gear to and disconnecting the ring gear from the gear nest when actuated to connect and disconnect the torque transmission;

wherein the differential disconnect assembly includes a spline ring which is movable into and out of engagement with one or more of the ring gear and the gear nest to respectively connect and disconnect the torque transmission; and the spline ring is slidably engaged with the ring gear and movable between a connected position and a disconnected position, and the spline ring engages with the pinion gear assembly when in the connected position and disengages from the pinion gear assembly when in the disconnected position;

wherein the spline ring is movable by a disconnect actuator;

wherein the differential locker includes a shift collar slidably coupled to one of the differential housing and the differential cover and movable into and out of engagement with one of the side gears to respectively lock or unlock the side gear with one or more of the differential housing and the differential cover;

wherein the shift collar is movable by a locker actuator;

wherein the differential locker includes a first biasing member to normally bias the shift collar to one of a locked position and an unlocked position, and the locker actuator moves the shift collar to the other of the locked position and the unlocked position; and wherein the locker actuator includes a first drive unit stationarily supported on the stationary housing and a first drive member displaceable axially to move the shift collar.

2. The differential disconnect and locker assembly according to claim 1, wherein the differential housing and the differential cover are supported on the stationary housing by respective bearings, the bearings also being allowed to stop spinning while the side gears are spinning.

3. The differential disconnect and locker assembly according to claim 1, wherein:

the differential disconnect assembly includes a second biasing member to normally bias the spline ring to one of the connected position and the disconnected position; and the disconnect actuator moves the spline ring to the other of the connected position and the disconnected position.

4. The differential disconnect and locker assembly according to claim 3, wherein the disconnect actuator includes a second drive unit stationarily supported on the stationary housing and a second drive member displaceable axially to move the spline ring.

5. A differential disconnect and locker assembly for a vehicle comprising:

a stationary housing;

a rotatable ring gear rotatably supported by the stationary housing;

a differential housing rotatably supported on the stationary housing, wherein the ring gear rotates together with the differential housing;

a pinion gear assembly comprising a plurality of pinion gears drivingly connectable to the ring gear, a gear nest supported radially and axially by the differential housing and can spin freely relative to the differential housing;

a plurality of side gears rotatably disposed within the stationary housing and meshing with the pinion gears such that the side gears and the pinion gears rotate together;

a differential disconnect assembly including a spline ring which is movable into and out of engagement with one or more of the ring gear and the gear nest such that the ring gear, the pinion gears, and the side gears when connected rotate together, the differential disconnect assembly being actuatable to operatively disconnect the ring gear from the gear nest to disconnect torque transmission between the ring gear and the pinion gears and prevent driving rotation of the ring gear by the pinion gears, wherein disconnection of the ring gear from the pinion gear assembly allows the ring gear and the differential housing to stop spinning while the side gears are spinning; and a shift ring fixedly coupled to the spline ring which is movable into and out of engagement with the one of the side gears to respectively lock or unlock the side gear with the gear nest.

6. The differential disconnect and locker assembly according to claim 5, wherein the shift ring is disengaged from the one of the side gears when the spline ring is in a disconnected position, and the shift ring is movable into and out of engagement with the one of the side gears to respectively lock and unlock the side gear with the gear nest while the spline ring is engaged with the gear nest and the ring gear.

7. The differential disconnect and locker assembly according to claim 6, further including an actuator configured to selectively move the spline ring into engagement with one or more of the ring gear and the gear nest.

8. The differential disconnect and locker assembly according to claim 7, wherein the actuator is configured to move the shift ring into engagement with one of the side gears while the spline ring is engaged with the gear nest and the ring gear.

9. The differential disconnect and locker assembly according to claim 8, wherein the actuator includes a cam ring axially slidable to move the spline ring into and out of engagement with the gear nest and to move the shift ring into and out of engagement with the one of the side gears.

10. The differential disconnect and locker assembly according to claim 9, wherein the actuator includes a cam actuator wherein rotation of the cam actuator causes the cam ring to slide axially to move the spline ring into and out of engagement with the gear nest and to move the shift ring into and out of engagement with the one of the side gears based on the rotational position of the cam actuator.

11. The differential disconnect and locker assembly according to claim 10, wherein the actuator includes a sector gear fixedly coupled to the cam actuator and a drive gear meshingly engaged with the sector gear such that rotation of the drive gear rotates the sector gear causing the cam actuator to rotate which moves the cam ring axially causing the spline ring to move axially.

12. The differential disconnect and locker assembly according to claim 11, wherein the actuator includes a motor fixedly coupled to the stationary housing and operatively coupled to the drive gear to cause the drive gear to rotate.

13. The differential disconnect and locker assembly according to claim 12, wherein:

the cam actuator includes a cam lobe having a ramp portion including an intermediate portion spaced between a base portion and a peak portion;

the cam ring includes a cam ramp;

the spline ring is disengaged from the gear nest and the shift ring is disengaged from the one of the side gears when the cam actuator is rotated such that the base portion is aligned with and engaged with the cam ramp;

the spline ring is engaged with the gear nest and the shift ring is disengaged from the one of the side gears when the cam actuator is rotated such that the intermediate portion is aligned with and frictionally engaged with the cam ramp; and the spline ring is engaged with the gear nest and the shift ring is engaged with the one of the side gears when the cam actuator is rotated such that the peak portion is aligned with and frictionally engaged with the cam ramp.

14. The differential disconnect and locker assembly according to claim 13, wherein the intermediate portion is a flat portion such that the actuator is bi-stable when the spline ring is engaged with the gear nest and the shift ring is disengaged from the side gears.

15. The differential disconnect and locker assembly according to claim 13, wherein the intermediate portion is an inclined portion such that the actuator is mono-stable when the spline ring is engaged with the gear nest and the shift ring is disengaged from the side gears.

16. The differential disconnect and locker assembly according to claim 13, wherein the peak portion is a flat portion such that the actuator is bi-stable when the spline ring is engaged with the gear nest and the shift ring is engaged with one of the side gears.

17. The differential disconnect and locker assembly according to claim 13, wherein the peak portion is an inclined portion such that the actuator is mono-stable when the spline ring is engaged with the gear nest and the shift ring is engaged from the side gears.

* * * * *